(12) United States Patent
Sawada

(10) Patent No.: US 7,791,589 B2
(45) Date of Patent: Sep. 7, 2010

(54) METHOD AND APPARATUS FOR DISPLAYING ELECTRONIC DOCUMENT INCLUDING HANDWRITTEN DATA

(75) Inventor: Yuji Sawada, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1084 days.

(21) Appl. No.: 11/387,839

(22) Filed: Mar. 24, 2006

(65) Prior Publication Data

US 2006/0221064 A1 Oct. 5, 2006

(30) Foreign Application Priority Data

Apr. 5, 2005 (JP) ............................. 2005-108418

(51) Int. Cl.
*G09G 5/00* (2006.01)
(52) U.S. Cl. ...................................... 345/156; 345/173
(58) Field of Classification Search ................. 345/173, 345/156; 382/186; 455/466; 715/246, 530; 707/513
See application file for complete search history.

(56) References Cited

U.S. PATENT DOCUMENTS

| | | | |
|---|---|---|---|
| 5,367,623 A | | 11/1994 | Iwai et al. |
| 6,317,762 B1* | | 11/2001 | Okawa et al. ................ 715/246 |
| 6,369,802 B1* | | 4/2002 | Ebisawa ...................... 345/173 |
| 6,396,598 B1 | | 5/2002 | Kashiwagi et al. |
| 7,224,991 B1* | | 5/2007 | Fuoss et al. .................. 455/466 |
| 2002/0078088 A1 | | 6/2002 | Kuruoglu et al. |
| 2002/0095440 A1* | | 7/2002 | Burgess et al. .............. 707/513 |
| 2004/0083429 A1 | | 4/2004 | Akiyama |
| 2004/0177324 A1* | | 9/2004 | Simmons et al. ............ 715/530 |
| 2004/0239639 A1* | | 12/2004 | Stavely et al. ................ 345/173 |
| 2004/0240739 A1* | | 12/2004 | Chang et al. ................ 382/186 |
| 2004/0252108 A1* | | 12/2004 | Xuan et al. .................. 345/173 |
| 2005/0183005 A1* | | 8/2005 | Denoue et al. .............. 715/512 |
| 2007/0216708 A1 | | 9/2007 | Mackay |

FOREIGN PATENT DOCUMENTS

| | | | |
|---|---|---|---|
| CN | 1314639 A | | 9/2001 |
| EP | 1 515 242 A2 | | 3/2005 |
| JP | 5-40594 A | | 2/1993 |
| JP | 9-101971 A | | 4/1997 |
| JP | 2000 250903 | | 9/2000 |
| JP | 2003 308310 | | 10/2003 |
| WO | WO-2004/038603 A1 | | 5/2004 |

* cited by examiner

*Primary Examiner*—Amare Mengistu
*Assistant Examiner*—Premal Patel
(74) *Attorney, Agent, or Firm*—Birch, Stewart, Kolasch & Birch, LLP

(57) ABSTRACT

A display apparatus (50) that appropriately displays a dynamic layout type electronic document having a handwritten memo additionally input to a main body even in different environments includes: a display unit (74) also serving as a handwritten data input unit (76); a layout calculating unit (72) calculating a layout of the dynamic layout type electronic document and giving a display on the display unit (74); a user writing processing unit (78) causing handwritten data of a user input through handwritten data input unit (76) to be displayed overlapping the electronic document that is being displayed; and a user data input/output unit (66) storing user data used for displaying the handwritten data in a user data storing unit (64) in relation to the electronic document. The user data includes shape data of the handwritten data, write area information specifying an area in the electronic document where the handwritten data was written, and layout information at the time of writing specifying the display layout of the electronic document when the handwritten data was formed.

8 Claims, 15 Drawing Sheets

METHOD AND APPARATUS FOR DISPLAYING ELECTRONIC DOCUMENT INCLUDING HANDWRITTEN DATA

CROSS-REFERENCE TO RELATED APPLICATION

This nonprovisional application claims priority under 35 U.S.C. §119(a) on Patent Application No. 2005-108418 filed in Japan on Apr. 5, 2005, the entire contents of which are hereby incorporated by reference.

BACKGROUND OF THE INVENTION

1. Field of the Invention

The present invention relates to an apparatus for displaying an electronic document and, more specifically, to an apparatus for displaying an electronic document that allows addition of a handwritten memo to an electronic document and appropriately displays both the electronic document and the handwritten memo, as well as to a method thereof 2. Description of the Related Art Electronic documents represented by electronic books may fall into the following two types in terms of layout-related characteristics.

One type of the electronic document has a concept of a page or pages, and the layout of characters, images and the like forming a main body of the electronic book is fixed. In this type of document, when the contents of the document are to be enlarged/reduced for display, all the elements are enlarged/reduced with the same magnitude, while the layout of characters and images on a page are maintained. Similarly, the document of this type is always displayed in the same layout even when the size of display area is changed or when it is to be displayed on a different terminal. In the present specification, such a type of electronic document that has the fixed layout as described above will be referred to as a static layout type electronic document.

The second type of the electronic document does not have the concept of a page or pages, as represented by HTML (Hyper Text Markup Language). In this type of electronic document, in accordance with various parameters including size and resolution of a display area, font to be used, character size and line space/letter space, the layout of characters and images forming the main body changes. In the present specification, such a type of electronic document that has the layout non-fixed will be referred to as a dynamic layout type document. Among apparatuses for displaying dynamic layout type electronic documents, some allow change in various parameters such as font, character size, sizes of margins, line space and letter space, and direction of imposition (vertical writing, horizontal writing), as the user prefers, to make the document easier to read.

Among the apparatuses for displaying electronic documents, some allow electronic writing to the document, as well as attachment of a tag.

By way of example, Japanese Patent Application Laid-Open No. (Tokkai) H05-40594 discloses an information processing apparatus that allows attachment of a tag to an electronic document. In this apparatus, it is possible to put a tag at an arbitrary position of each page of the displayed document, and further, it is possible to record any character, figure or image on the tag.

Japanese Patent Application Laid-Open No. (Tokkai) H09-101971 discloses a personal electronic book apparatus configured to store information such as text data, voice, drawings, handwritten characters, signs and the like added by users in user-specific areas. In this apparatus, the data added by a user are each stored in the form of a file, and relation between the files and character strings in the main body is specified, so as to realize writing of the information into the document. In this apparatus, it is also possible to underline some part of the main body.

The techniques disclosed in H05-40594 and H09-101971 do not allow direct addition of a handwritten memo to the main body that is being displayed. Such a function would be convenient. In such a case, generally, a prescribed position on the image plane would be used as a reference position, and the position where the handwritten memo is input would be represented by relative coordinates with respect to the reference position. Use of the relative coordinates enables display of the handwritten memo at the same position as that at the time of input, on the layout when the same page is displayed next time.

If the document is the static layout type document, the above-described method may be applied without any problem when a handwritten memo is directly added to the main body that is being displayed. If the document is the dynamic layout type document, however, there would be a complicated problem, as the display layout of the main body changes dependent on conditions of layout (such as the size of display screen, used font, font size and margin size), and the position or size of display of the handwritten memo cannot uniquely be defined.

Referring to FIG. 1, assume that in a document area 30 of a certain size, a handwritten memo 40 input by a user is displayed together with characters and the like forming the main body of the electronic document. The handwritten memo 40 includes characters "attention!" and arrows and underlines to two character strings 42 (represented by three hatched circles) and 44 (represented by three white circles).

FIG. 2 shows an exemplary display that appears when the electronic document is displayed on a display apparatus having a document area of different width from document area 30, with handwritten memo 40 superposed thereon. Referring to FIG. 2, the document area 32 of this apparatus is wider than document area 30. If the electronic document is of the dynamic layout type, different width means different position of return position (line wrapping) of the letter at the end of a line. In the example shown in FIG. 2, the position of character string 44 is shifted to the right of an upper line. As a result, the arrow to character string 44 included in handwritten memo 40 is off from the originally intended position. Similarly, the display position of the main body is also shifted, so that the characters "attention!" comes to overlap the body text. Specifically, the dynamic layout type document involves a problem that when the size of display screen changes, relation between the handwritten memo and the corresponding main body becomes unclear, resulting in an awkward display.

When the length (vertical width) of the display screen is different, the number of lines that can be displayed on one screen image is also different. As a result, when one same electronic document is displayed successively from the head on two display apparatuses having display screens of different sizes, the portion where the handwritten memo is added would be displayed on different pages counted from the head and on different lines of the displayed page. Therefore, even when the position of the handwritten memo is recorded by specifying the position of the memo as originally written along the vertical direction (for vertical writing, position along the horizontal direction) and the page number where the handwritten memo exists, it is impossible to display the handwritten memo at an appropriate position. The display position of the handwritten memo would be inappropriate on a dynamic layout type electronic document not only when the size of display screen is changed but also when display environment including layout rules such as font type or size, letter space or line space, method of justification, or parameters related to the layout is changed. Similar problem arises when one same electronic document is displayed on different display apparatuses, as the parameters mentioned above generally vary.

SUMMARY OF THE INVENTION

Therefore, an object of the present invention is to provide an apparatus for displaying an electronic document that allows appropriate display of a document including a main body of a dynamic layout type electronic document and an additional handwritten memo even under different image display environments.

Another object of the present invention is to provide an apparatus for displaying an electronic document that allows appropriate display of a document including a main body of a dynamic layout type electronic document and an additional handwritten memo even when parameters for image display changes.

A still further object of the present invention is to provide an apparatus for displaying an electronic document that allows display of a document including a main body of a dynamic layout type electronic document and an additional handwritten memo while the relation between the handwritten memo as added and the corresponding main body is maintained appropriately, even when the document is displayed under different image display environments.

An additional object of the present invention is to provide an apparatus for displaying an electronic document that allows display of a document including a main body of a dynamic layout type electronic document and an additional handwritten memo, with the handwritten memo as added displayed at a position having clear relation to the main body that corresponds to the memo, even when the document is displayed under different image display environments.

A still further object of the present invention is to provide an apparatus for displaying an electronic document that makes clear the relation between a handwritten memo as originally input and the corresponding main body, even under such an environment where it is difficult to display the document including a main body of a dynamic layout type electronic document and an additional handwritten memo while maintaining relation between the handwritten memo and the corresponding main body.

According to a first aspect, the present invention provides an apparatus for displaying an electronic document, including: a display unit having a prescribed display area, also serving as a handwriting input unit; a layout calculating unit configured to calculate a layout of display on the display area of a dynamic layout type electronic document in accordance with a prescribed display parameter, to cause the electronic document to be displayed on the display unit in accordance with the layout; a handwritten data processing unit configured to receive an input of handwritten data of a user through the handwriting input unit, and to cause the handwritten data to be displayed on the display unit, overlapping the electronic document being displayed on the display area; and a user data storing unit configured to store user data used for displaying the handwritten data, in a prescribed recording medium in relation to the electronic document; wherein the user data includes shape data specifying a shape of the handwritten data, write area information specifying an area in the electronic document where the handwritten data was written, and layout information at the time of writing specifying a display layout of the electronic document when the handwritten data was formed.

The layout calculating unit calculates the layout of a dynamic layout type electronic document and causes a display to appear on the display unit. When a user inputs handwritten data using the handwriting input unit, the handwritten data processing unit causes the handwritten data to be displayed superposed on the electronic document that is being displayed. The user data storing unit stores user data including the shape data, write area information and layout information at the time of writing, in relation to the electronic document that is being displayed, in a prescribed storage medium.

In addition to the shape data of the handwritten data, the information of write area of the handwritten data and the layout information at the time of writing for specifying the layout of the main body of the electronic document when the handwritten data was written are stored. By using these pieces of information, it becomes possible, when the electronic document is to be displayed under a different display environment, to provide a display that clarifies the meaning of the handwritten data to the electronic document, such as a display in which the handwritten data and the electronic document are overlapping to have correct relation therebetween, or a display in accordance with a different method, if correctly overlapping display is impossible.

Preferably, the layout information at the time of writing includes the prescribed display parameter used for calculating a display layout of the electronic document that had been displayed when the handwritten data was written.

As the display parameter at the time of input of the handwritten data is stored, the display layout of the electronic document when the handwritten data was written can be reproduced, and therefore, relation on display between the handwritten data and the electronic document can be determined correctly.

Preferably, the shape data includes coordinates of one or a plurality of vertexes forming a plurality of polygonal lines forming the handwritten data; and the coordinates of the one or a plurality of vertexes are each represented by a coordinate system having, as the origin, a position of the electronic document displayed on the display unit when the handwritten data was written, which position has a prescribed relation with an area to which the hand written data was written.

Using the coordinate system having, as the origin, a position of the electronic document of a prescribed relation with the area where the handwritten data was written, the position of the shape data is specified. Therefore, relative position of each point of the handwritten data with respect to a specific position of the electronic document can be designated. As the position of each point of handwritten data is recorded as relative position using the area where the writing was done in the electronic document as the reference, the writing can easily be displayed overlapping each other at the correct position on the corresponding line of the electronic document, even when displayed in a different layout.

Preferably, the user data includes a file name of an image file recording an image of the handwritten data and a main body displayed on the display area when the handwritten data was written.

As the file name is recorded, the relation between the handwritten data and the main body when the handwritten data was input can be confirmed by an image, even if it is impossible to display the handwritten data and the main body of the electronic document in a correctly overlapping manner.

According to a second aspect, the present invention provides an apparatus for displaying an electronic document, including: a display unit having a prescribed display area; a first reading unit configured to read a dynamic layout type electronic document from a prescribed storage medium; a second reading unit configured to read, from a prescribed storage medium, user data including shape data specifying the shape of handwritten data written to the electronic document, write area information specifying a position in the electronic document where the handwritten data was written, and layout information at the time of writing specifying a display layout of the electronic document when the handwritten data was formed, and related to the electronic document read by the first reading unit; and a layout calculating unit configured to calculate a layout of the electronic document read by the first reading unit and layout of the handwritten data read by the second reading unit, based on a display parameter set in the display unit. The layout calculating unit includes a determining unit configured to determine, using the display parameter and the layout information at the time of writing, whether it is possible to give a display maintaining positional relation between the handwritten data and the electronic document in the vicinity of the handwritten data at the time when the hand written data was formed, if the electronic document were laid-out using the display parameter and the handwritten data were laid-out based on the layout information at the time of writing, and a first layout unit configured to calculate, in response to a determination by the determining unit that the display maintaining the relation is possible, a layout to have the handwritten data overlapping the electronic document while maintaining the positional relation between the handwritten data and the electronic document in the vicinity of the handwritten data, using the display parameter and the layout information at the time of writing.

The first reading unit reads the electronic document from the storage medium. The second reading unit reads the user data related to the electronic document from the storage medium. The layout calculating unit calculates the layout of the electronic document and the handwritten data in the user data, based on the display parameter set in the display unit and on the layout information read from the second reading unit. The determining unit determines whether it is possible to display the electronic document and the handwritten data overlapping one another while maintaining the original layout of these two at the time when the handwritten data was written. If such display is possible, the first layout unit calculates layout for displaying the handwritten data overlapping the electronic document that is being displayed.

As the user data is used, it becomes possible to determine whether the electronic document and the handwritten data can be displayed overlapping one another while maintaining the original layout of these two at the time of writing of the handwritten data, and these two data are displayed in the overlapping manner when such display is possible. It will be easier for the user to correctly understand the relation between the handwritten data and the electronic document.

Preferably, the layout calculating unit further includes a second layout unit configured to calculate a prescribed layout to have the handwritten data and the electronic document not overlapping each other, in response to a determination by the determining unit that the display maintaining the relation is impossible.

As described above, if the layout of the electronic document and the handwritten data at the time of writing of the handwritten data cannot be maintained, the second layout unit lays out these two not to overlap each other. When the relation between the two is different from that at the time of writing of the handwritten data, overlapping display is avoided, and therefore, misunderstanding of the relation between the handwritten data and the electronic document would be less likely.

Preferably, the user data includes a file name of an image file recording a state of display of the handwritten data and a main body, displayed on the display unit when the handwritten data was written; and the second layout unit executes a prescribed process for displaying the image file, in response to a determination by the determining unit that the display maintaining the relation is impossible.

When the layout of the electronic document and the handwritten data at the time of writing of the handwriting data cannot be maintained, a image file recording the state of display of the main body and the handwritten data at the time of input of the handwritten data can be read, referring to the file name in the user file. By displaying the mage, the state when the handwritten data was input can be reproduced, and therefore, it will be easier for the user to correctly understand the relation between the handwritten data and the electronic document.

According to a third aspect, the present invention provides a method of displaying an electronic document on a display apparatus having a prescribed display area serving also as a handwriting input apparatus, including: the reading step of reading a dynamic layout type electronic document from a prescribed storage medium; the layout calculating step of calculating a display layout of the electronic document read in the reading step, in accordance with a display parameter set in advance in relation to the display area; the display step of displaying contents of the electronic document on the display area, in accordance with the display layout calculated in the layout calculating step; the handwritten data input step of receiving an input of handwritten data from the handwriting input apparatus, to the electronic document displayed on the display unit, and displaying the handwritten data overlapping a main body of the electronic document, on the display area; and the step of saving user data including information specifying a display layout of the electronic document at the time when the handwritten data was input. The user data includes shape data specifying shape of the handwritten data, write area information specifying a position in the electronic document where the handwritten data was written, and layout information at the time of writing specifying a layout of a main body of the electronic document when the handwritten data was written.

According to a fourth aspect, the present invention provides a computer readable recording medium storing instructions for causing a computer, which is connectable to a prescribed storage medium and to a display apparatus having a prescribed display area that also serves as a handwriting input apparatus, to execute the method of displaying an electronic document according to the third aspect of the present invention.

According to a fifth aspect, the present invention provides a computer implemented method of displaying an electronic document on a display apparatus having a prescribed display area serving also as a handwriting input apparatus. The method includes: the first reading step of reading a dynamic layout type electronic document from a prescribed storage medium; the second reading step of reading, from a prescribed storage medium, user data including shape data specifying the shape of handwritten data written to the electronic document, write area information specifying a position in the electronic document where the handwritten data was written, and layout information at the time of writing specifying a display layout of the electronic document when the handwritten data was formed, and related to the electronic document read in the first reading step; and the step of calculating a layout of the electronic document read in the first reading step and a layout of the handwritten data read in the second reading step, based on a display parameter set in the display apparatus. The step of calculating layouts includes the steps of determining, using the display parameter and the layout information at the time of writing, whether it is possible to give a display maintaining positional relation between the handwritten data and the electronic document in the vicinity of the handwritten data at the time when the hand written data was formed, if the electronic document were laid-out using the display parameter and the handwritten data were laid-out based on the layout information at the time of writing, and calculating, in response to a determination in the determining step that the display maintaining the relation is possible, a layout to have the handwritten data overlapping the electronic document while maintaining the positional relation between the handwritten data and the electronic document in the vicinity of the handwritten data, using the display parameter and the layout information at the time of writing.

According to a sixth aspect, the present invention provides a computer readable recording medium storing instructions for causing a computer, which is connectable to a prescribed storage medium and to a display apparatus having a prescribed display area that also serves as a handwriting input apparatus, to execute the method of displaying an electronic document according to the fifth aspect of the present invention.

According to a seventh aspect, the present invention provides an apparatus for displaying an electronic document, including a processor, a memory connected to the processor, a display unit, operatively connected to the processor, having a prescribed display area serving also as a handwriting input apparatus, and a prescribed storage medium coupled to the processor, for displaying an electronic document stored in the prescribed storage medium on the display area. The memory stores a computer program to be executed by the processor. The computer program includes: the first reading program code for reading a dynamic layout type electronic document from a prescribed storage medium; the second reading program code for reading, from a prescribed storage medium, user data including shape data specifying the shape of handwritten data written to the electronic document, write area information specifying a position in the electronic document where the handwritten data was written, and layout information at the time of writing specifying a display layout of the electronic document when the handwritten data was formed, and related to the electronic document read by the first reading program code; and a program code for calculating a layout of the electronic document read by the first reading program code and a layout of the handwritten data read by the second reading program code, based on a display parameter set in the display apparatus. The program code for calculating layouts includes the a program code for determining, using the display parameter and the layout information at the time of writing, whether it is possible to give a display maintaining positional relation between the handwritten data and the electronic document in the vicinity of the handwritten data at the time when the hand written data was formed, if the electronic document were laid-out using the display parameter and the handwritten data were laid-out based on the layout information at the time of writing, and a program code for calculating, in response to a determination by the determining program code that the display maintaining the relation is possible, a layout to have the handwritten data overlapping the electronic document while maintaining the positional relation between the handwritten data and the electronic document in the vicinity of the handwritten data, using the display parameter and the layout information at the time of writing.

According to the present invention, in addition to the shape data of the handwritten data, the information of write area of the handwritten data and the layout information at the time of writing for specifying the layout of the main body of the electronic document when the handwritten data was written are stored. By using these pieces of information, it becomes possible, when the electronic document is to be displayed under a different display environment, to provide a display that clarifies the meaning of the handwritten data to the electronic document, such as a display in which the handwritten data and the electronic document overlap to have correct relation therebetween, or to reproduce the layout of the handwritten data at the time of writing by using a different method of display, if correctly superposed display is impossible.

The shape of the handwritten data is represented by coordinates using a coordinate system having a position of a prescribed relation to the area where the handwritten data was written as the origin. Therefore, even when the display position of the line on which handwriting was done differs from that at the time of writing, the handwritten data can be displayed correctly overlaping the corresponding line.

When the handwritten data is written, the file name of an image file recording the state of display of the handwritten data and the main body displayed on the display unit is stored together with the handwritten data. Even when correctly overlapping display is impossible, the state of writing of the handwritten data can be presented to the user by opening the image file, using the file name.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
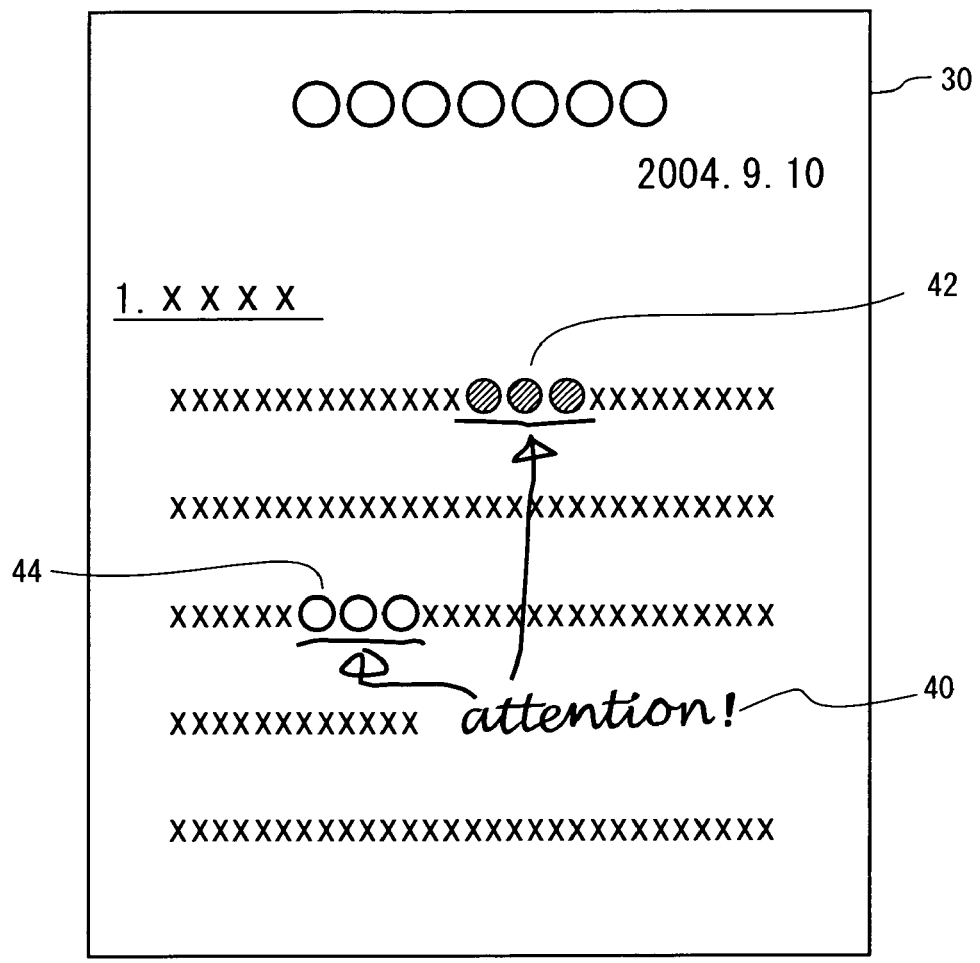
FIG. 1 shows a state of display in which handwritten data is correctly overlapping an electronic document.

In the following, an apparatus for displaying an electronic document in accordance with the present invention will be described with reference to the figures. In the following description, the same reference characters denote the same components. The names and functions are also the same. Therefore, detailed description thereof will not be repeated. Though the following embodiments are related to a portable information terminal, the present invention is not limited to such embodiments. The present invention is also applicable to non-portable apparatus, such as a so-called desk-top apparatus.

In the present application, data for displaying handwritten memo or the like written by the user on the electronic document will be referred to as "user data." Further, in the present application, a "display parameter" refers to a parameter that has an influence on the layout of electronic document. The display parameter includes an arbitrary combination of layout rules and the like adopted by the apparatus, such as direction of imposition such as vertical writing or horizontal writing, number of pixels or resolution of a display screen, font and font size used for display, character attributes such as bold/italic, line space and letter space, margin size, justification or kerning.

In the embodiments described in the following, plain text will be described as an example of the electronic document. As will be readily understood by those skilled in the art, the present invention is also applicable to a tagged document such as HTML, which allows insertion of an image or change of attribute of part of character strings. In that case, the layout rule includes a method of layout determined by the tag.

<Configuration>

Figure 3:
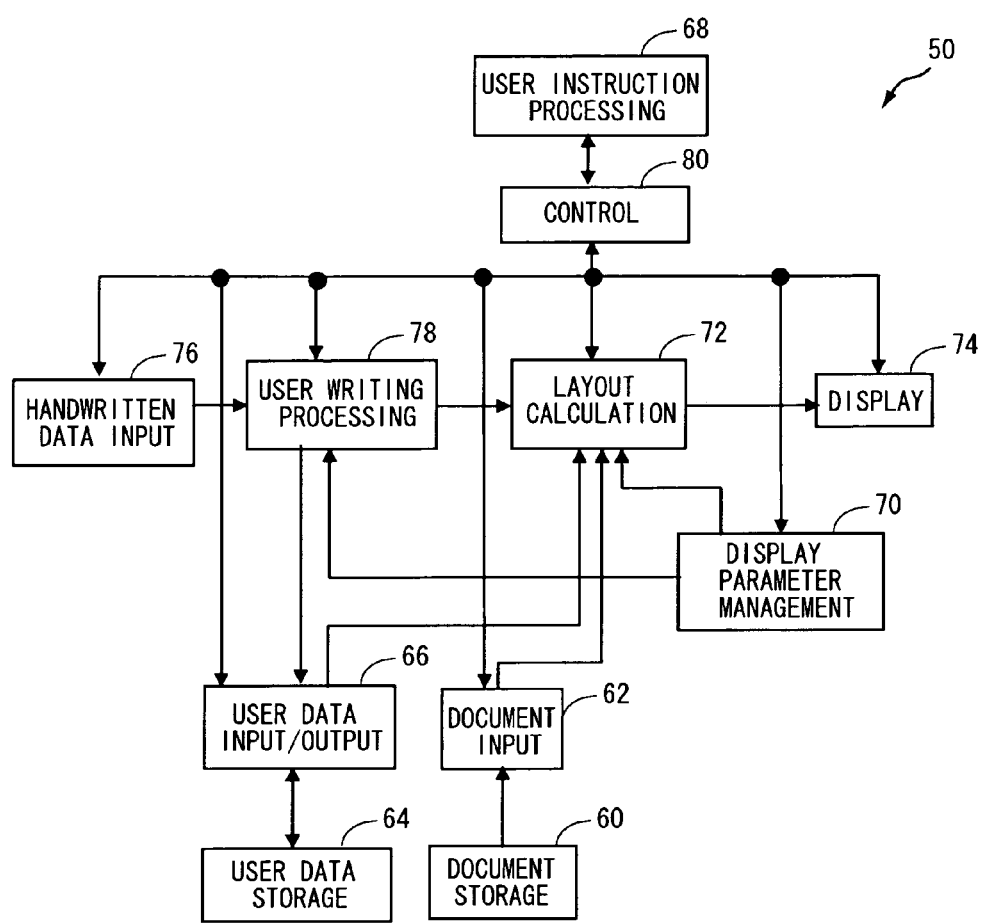
FIG. 3 is a block diagram of a display apparatus 50 in accordance with an embodiment of the present invention.

Referring to FIG. 3, a display apparatus 50 includes: a document storing unit 60 for storing an electronic document; a document input unit 62 responsive to a prescribed instruction for forming a list of electronic documents stored in document storing unit 60 and reading a designated document; a user data storing unit 64 for storing user data written by hand to an electronic document; a user data input/output unit 66 responsive to a prescribed instruction for reading user data stored in user data storing unit 64 and writing, when contents written by the user is changed, the changed user data to user data storing unit 64; a user instruction processing unit 68 receiving an instruction for turning a page, designation of an electronic document to be displayed, an instruction to change a display parameter or the like from the user and for processing accordingly; and a display parameter management unit 70 for recording and managing display parameters.

Display apparatus 50 further includes: a layout calculating unit 72 for calculating, using the display parameters stored in display parameter managing unit 70, the layout of characters and images included in the electronic document read by document input unit 62 from document storing unit 60 and in the user data read by user data input/output unit 66 from user data storing unit 64; a display unit 74 for displaying the electronic document in accordance with the layout calculated by layout calculating unit 72; a handwritten data input unit 76 for receiving handwritten input by the user using a display area of display unit 74; a user writing processing unit 78 processing the handwritten input by the user input through handwritten data input unit 74, instructing layout calculating unit 72 to provide real-time display on display unit 74, and reflecting the written contents on the user data through user data input/output unit 66; and a control unit 80 controlling these processing units to realize the operation described above.

Figure 4:
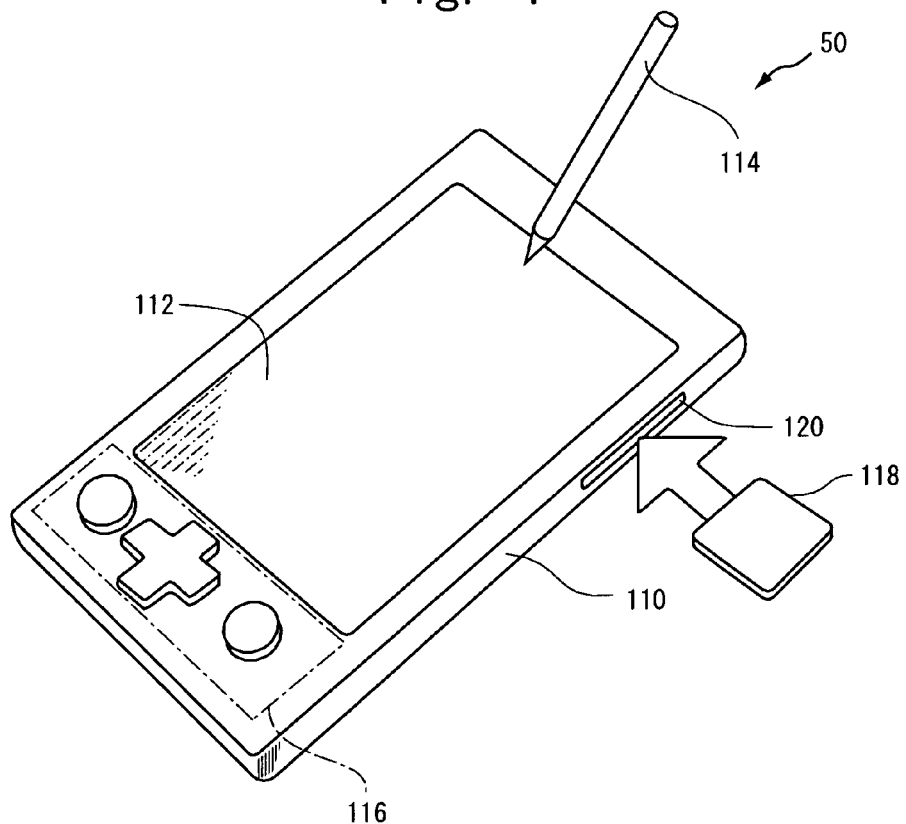
FIG. 4 shows an appearance of display apparatus 50 in accordance with an embodiment of the present invention.

Referring to FIG. 4, display apparatus 50 further includes a housing 110 of display apparatus 50, and a display-and-tablet unit 112 arranged on a front surface of housing 110. Display-and-tablet unit 112 corresponds to display unit 74 and handwritten data input unit 76 shown in FIG. 3, and the display area of display unit 74 also serves as the input area of handwritten data input unit 76. Display apparatus 50 further includes: a pen 114 prepared separate from housing 110 and used when the user inputs handwritten data or the like to display-and-tablet unit 112; and an instruction key 116 arranged next to display-and-tablet unit 112 on the surface where display-and-tablet unit 112 is provided on housing 110, and used when the user selects an electronic document to be displayed, instructs a page turn, or changes a display parameter. The instruction input through instruction key 116 is interpreted by user instruction processing unit 68 shown in FIG. 3, and in accordance with the interpretation, control unit 80 controls each block.

On a side surface of housing 110 of display apparatus 50, a slot 120 is formed, to/from which a recording medium 118 for recording the electronic document and the user data is inserted/ejected. Recording medium 118 forms document storing unit 60 and user data storing unit 64 shown in FIG. 3. Deep inside the slot 120, there is a connector, not shown, and recording medium 118 inserted to slot 120 is connected by the connector to display apparatus 50. In this manner, through the connector, the electronic document and the user data are read from recording medium 118 and displayed by display apparatus 50.

In the present embodiment, it is assumed that various types of display apparatuses might be used. Specifically, it is assumed that there are various and many types of display apparatuses having different display parameters, including the size and resolution of display unit 74, installed fonts, and layout rules to be followed. As a result, when one same electronic document is displayed on different display apparatuses, the characters and the like displayed on display unit 74 are generally in different layouts. Even when one electronic document is displayed on one display apparatus, the one electronic document is not always displayed in one same layout, as the apparatus allows display in vertical writing or adjustment of line space/letter space as preferred by the user.

In the following description, it is assumed that the contents of electronic documents and user data can be displayed on any display apparatus, when the electronic documents and the user data are moved by means of recording medium 118. Therefore, it is also assumed that any of the electronic documents and any user data are recorded on recording medium 118 in a prescribed data storing form (format).

In the present embodiment, as described above, plain text is adopted as the data storage form of the electronic document, by way of example for description.

Figure 5:
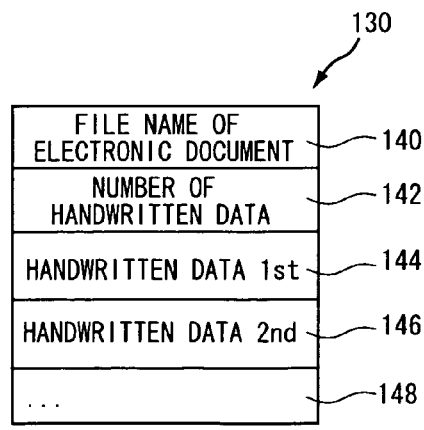
FIG. 5 shows a data structure of user data 130.

Referring to FIG. 5, user data 130 in accordance with the present embodiment is stored in the following form. Specifically, user data 130 includes: an area 140 for recording a file name of the electronic document that corresponds to user data 130; an area 142 for recording the number of data written by the user to the document; and areas 144, 146, . . . 148 provided in the same number as the number stored in area 142, each for recording individual handwritten data.

Figure 6:
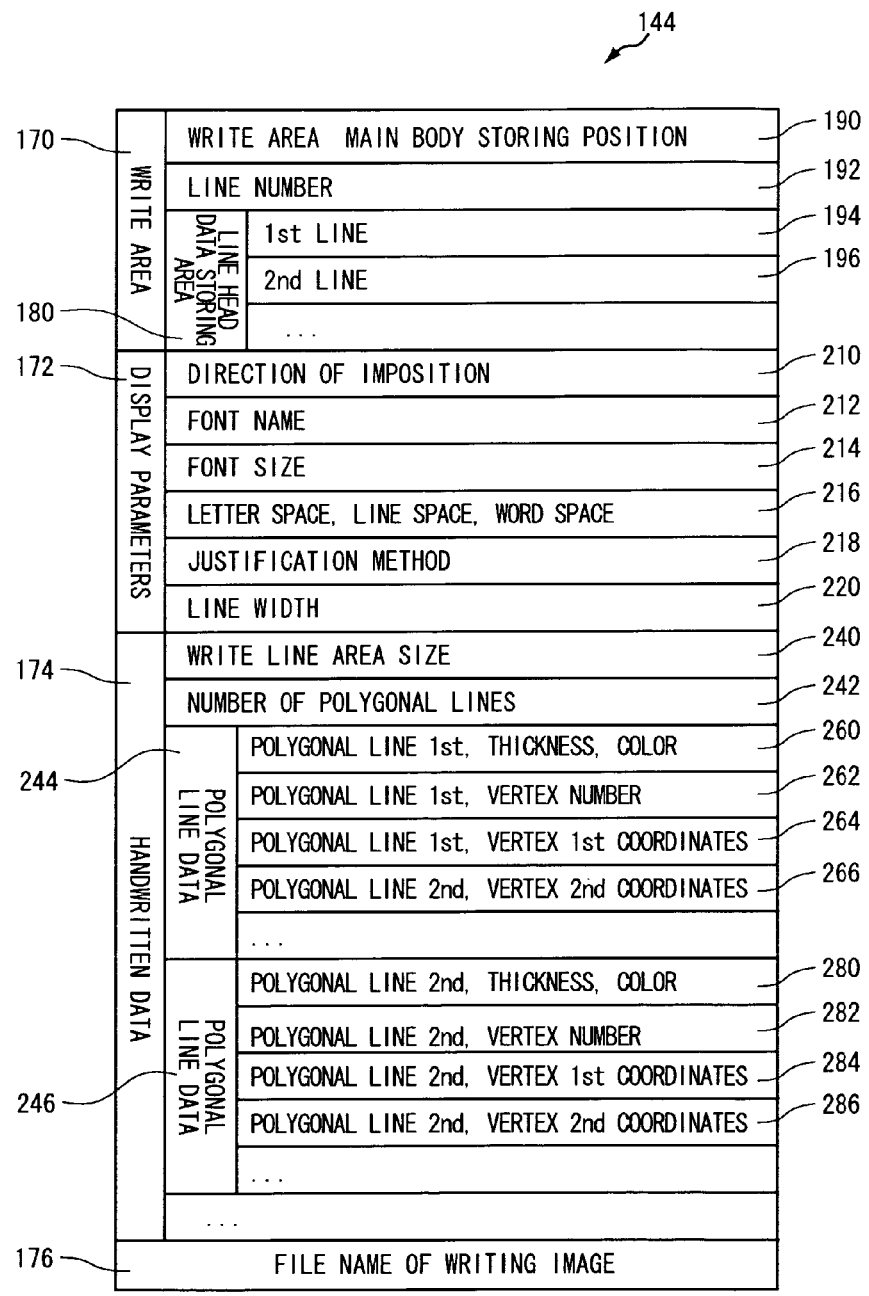
FIG. 6 shows a data structure of an area 144 for storing handwritten data, of user data 130.

Areas 144, 146, . . . 148 all have the same format. FIG. 6 shows, as an example, the data storage form of area 144. In the following description, it is assumed that the electronic document is written in horizontal direction. When written vertically, some of the terms used in the following must be appropriately modified.

Referring to FIG. 6, area 144 includes: a writing area 170 for recording a position of storage of the input handwritten data in a file of the electronic document; a display parameter area 172 for recording display parameters when the handwritten data was written; a handwritten data area 174 for storing the handwritten data; and an image file name area 176 for recording an image file name of the image file of the state of display at the display unit captured and saved when the handwritten data was written.

A line head data storing area 180 includes areas 194, 196, . . . storing positions of storage in the file of the head character of respective lines of the main body that overlaps in vertical direction on the height of the handwritten data. The areas 194, 196, . . . are provided in the same number as the number of lines that vertically overlap the handwritten data.

Figure 7:
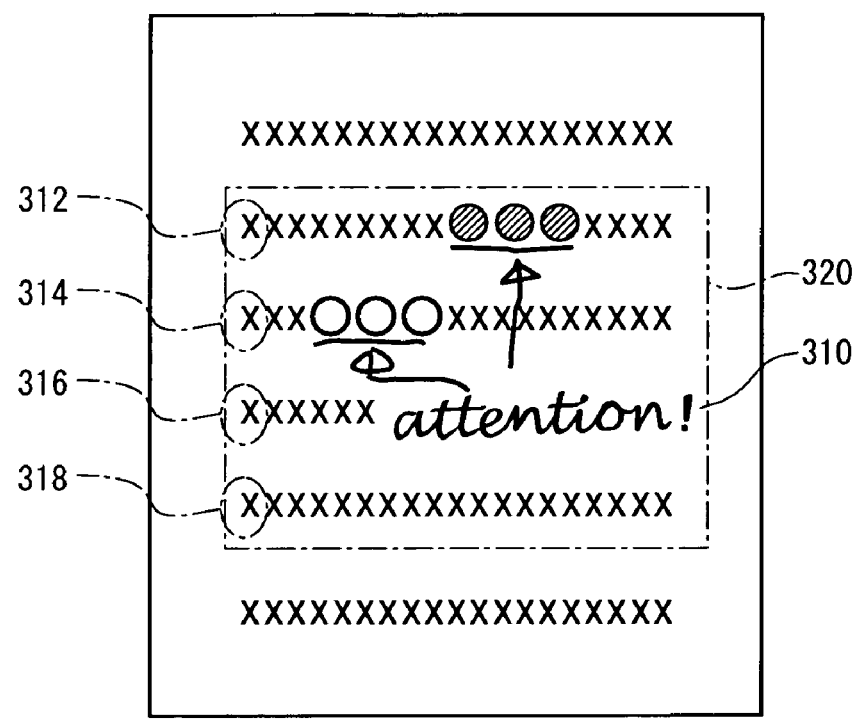
FIG. 7 shows the display unit with handwritten data written in a main body area.

In the present embodiment, the main body near the handwritten data, such as a line of the main body which the handwritten data overlaps, is used as a reference, to determine an area where the handwritten data is written, in the following manner. When handwriting is in the main body display area as in the case of handwritten data 310 shown in FIG. 7, the lines which handwritten data 310 overlaps, that is, four lines surrounded by a rectangle 320 of FIG. 7, is determined to be the position of the writing area. Here, in area 190, positions of storage of the head character on the first line and the last character on the fourth line among the four lines are recorded in terms of the number of bytes from the head of the electronic document file. In a line number storing area 192, the number of lines that are surrounded by rectangle 320, that is, "4", is stored. In areas 194, 196, . . . of line head data storing area 180, the number of bytes from the head of the electronic document file of the head characters 312, 314, 316 and 318 of respective lines are recorded.

If the handwritten data is written on a margin of the display area, it is impossible to specify to which line the handwriting is done. Therefore, when the writing is in the margin of the display area, the line specified in the following manner is determined to be the writing area.

Figure 8:
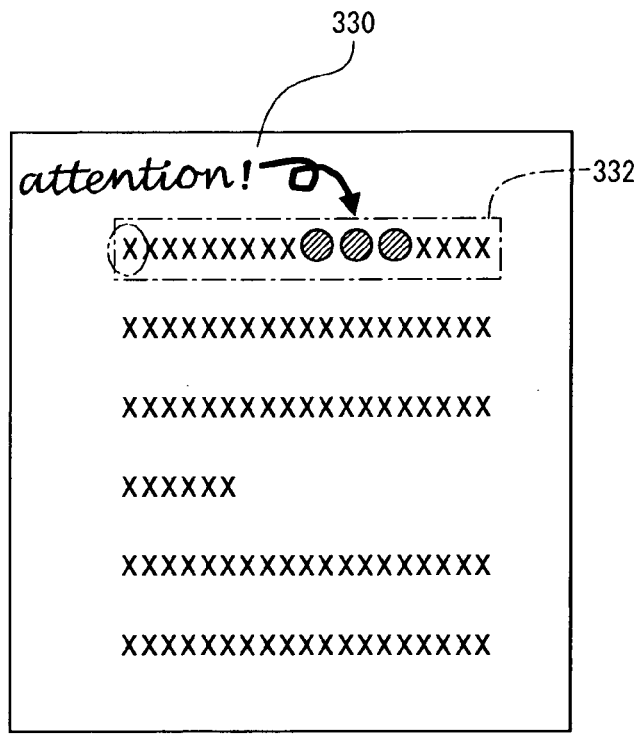
FIG. 8 shows the display unit with handwritten data written on an upper margin.
Figure 9:
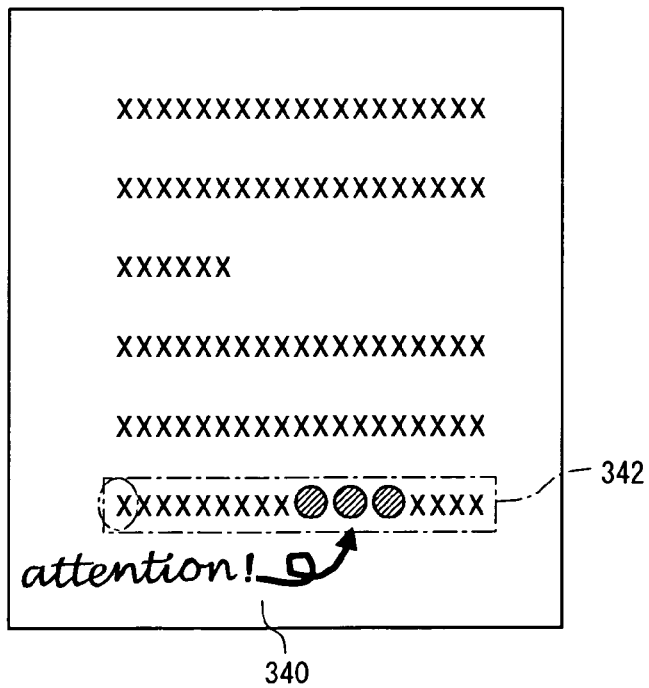
FIG. 9 shows the display unit with handwritten data written on a lower margin.
Figure 10:
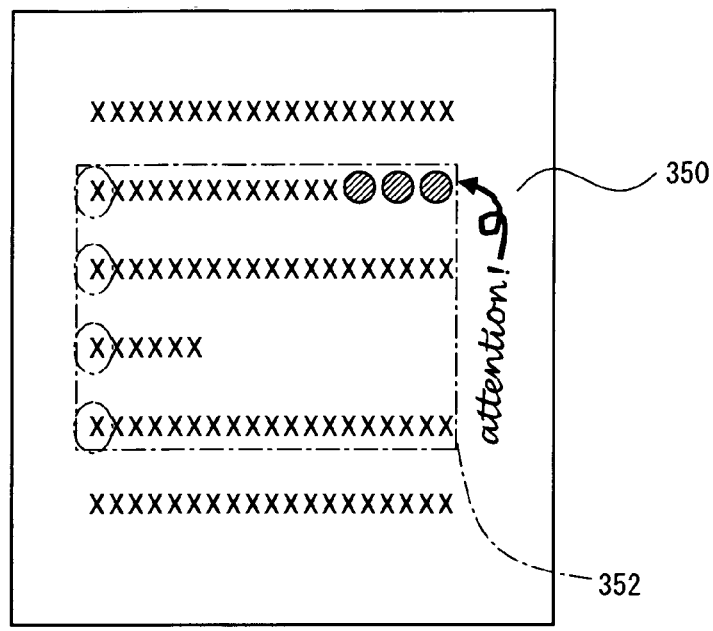
FIG. 10 shows the display unit with handwritten data written on a right margin.
Figure 11:
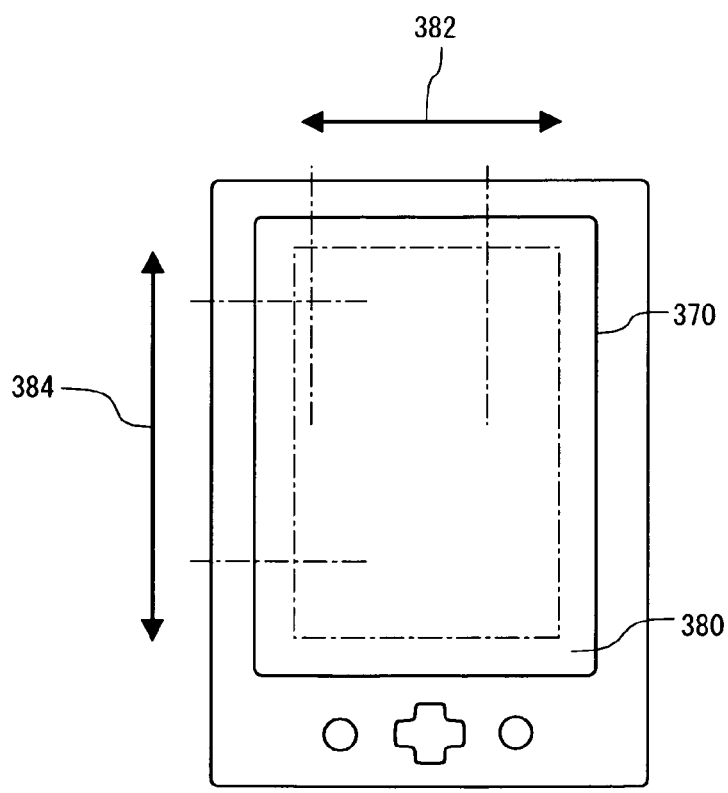
FIG. 11 is a schematic view of the display unit illustrating the margin and line width.

When the handwritten data 330 is on the upper margin as shown in FIG. 8, the line to which writing is done is determined to be the head line (surrounded by rectangle 332) of the document that is being displayed. When the handwritten data 340 is on the lower margin as shown in FIG. 9, the line to which writing is done is determined to be the last line (surrounded by rectangle 342) of the document that is being displayed on that page. When the handwritten data 350 is on the right margin as shown in FIG. 10, the line to which writing is done is determined to be the lines on the left of handwritten data 350, that is, the four lines surrounded by a rectangle 352 in the example of FIG. 10. Similarly, when the writing is on the left margin, lines on the right side are determined to be the writing line (determined to be the lines corresponding to the handwriting).

It is commonly understood in the examples shown in FIGS. 7 to 10 that each page includes a plurality of lines arranged from the top to the bottom (in horizontal writing) or from right to left (in vertical writing), each line includes characters arranged in a direction crossing the arrangement of lines, and the following relation is found between the body area formed thereof and the handwritten characters.

Specifically, when at least a part of the area where the handwritten data is written overlap the displayed area of the electronic document, the position defined by the head character of the head line of the electronic document in the overlapping area serves as a reference to determine the writing position of the handwritten data. When the area where the handwritten data is written does not overlap the displayed area of the electronic document, the position defined by the head character of the head line displayed in that area of the electronic document which would possibly overlap the area of the handwritten data as moved from the original area where the handwritten data is written along the direction of arrangement of lines, or along the direction of characters in each line crossing the direction of line arrangement, is used as the reference position. In the present specification, the portion of the main body that includes the reference position for determining the writing position of the handwritten data will be referred to as a "vicinity" of the handwritten data.

The description of FIGS. 8 to 10 assumes horizontal writing, as described above. For displaying vertical writing, the upper, lower, right and left margins for the horizontal writing are respectively read to be right, left, upper and lower, for determination. By way of example, the description of FIG. 8 would be read as "when the handwritten data 330 is on the right margin, the line to which writing is done is determined to be the head line (rightmost line) of the document that is being displayed."

Again referring to FIG. 6, in display parameter area 172, all parameters that have any influence on the layout are recorded, so that the layout of the main body can be fixed. When the handwritten data is to be recorded in the structure shown in FIG. 6 as in the present embodiment, the return position of each line is known from the line head data storing area 180. Therefore, it is not necessary to specifically record the parameter that determines the return position of a line (such as the lateral width of the display area in the case of horizontal writing). Therefore, in display parameter area 172, mainly the parameters necessary for uniquely determining the layout of each of the characters on one line are recorded.

Specifically, in the present embodiment, display parameter area 172 includes: an area 210 for recording direction of imposition; an area 212 for storing the name of used font; an area 214 for storing font size; an area 216 for recording sizes of letter space, line space and word space; an area 218 for recording justification method; and an area 220 for recording line width that is necessary for the justification.

In area 210 for recording the direction of imposition, whether the electronic document was displayed as vertical writing or horizontal writing at the time when the user data was written is recorded. In area 212, the name of the font used for display is recorded by the dot number. In area 214, the font size is recorded also by the dot number.

The letter space recorded in area 216 refers to the number of dots between letters. The line space refers to the number of dots between lines. The word space refers to the number of dots of the space inserted between words.

The justification process related to area 218 refers to hyphenation at the end of a line or a process of aligning line ends by adjusting letter space or word space when line end positions are off from each other by word wrapping in alphanumeric display. The position of character display differs dependent on the method of adjusting the letter space or word space. Therefore, in area 218, the name specifying the method of justification process and, if necessary, version number of justification program used. If the process algorithm can be specified by a parameter, the parameter may be recorded in area 218 rather than recording the name of the justification method.

The line width recorded in area 220 is necessary for the justification process. The definition of line width differs for vertical writing and horizontal writing. Consider an area in which characters are displayed (as represented by dotted rectangle), which is the display portion 370 with a margin area 380 removed. The line width for vertical writing refers to the size 384 along the vertical direction of the display area, which is represented here by the number of pixels. The line width for horizontal writing refers to the size 382 along the lateral direction, which is also represented by the number of pixels.

As already described, when display parameters other than those mentioned above are necessary, areas for recording these are provided in display parameter area 172, and the values are recorded therein.

On the other hand, part of the information shown in FIG. 6 may not always be necessary. By way of example, if the same justification process is done by all the display apparatuses used for displaying the electronic documents, or when none of the display apparatuses performs the justification process, the area 218 for recording the method of justification is unnecessary. Specifically, display parameter area 172 may be designed such that necessary and sufficient display parameters, which are referred to by layout calculating unit 72 of every display apparatus that can process the electronic document and the user data, can appropriately be recorded.

Handwritten data area 174 is for recording the information of the actually written handwritten data. In the present embodiment, the handwritten data is recorded as a set of a plurality of polygonal lines.

Handwritten data area 174 includes: an area 240 for recording the size of the area by number of lines in which the handwritten data is written; an area 242 for recording the number of polygonal lines included in the handwritten data; and areas 244, 266, . . . provided in the same number as the polygonal lines, for recording detailed data of each polygonal line included in the handwritten data.

Areas 244, 246, . . . for recording the polygonal line data all have the same structure. By way of example, area 244 includes an attribute area 260 for recording attribute information including thickness and color of a first polygonal line included in the handwritten data; an area 262 for recording the number of vertexes forming the first polygonal line; and areas 264, 266, . . . for recording coordinate values of respective vertexes. There are areas for recording the coordinate values same in number as the vertexes stored in area 262.

Area 246 has the same structure, and has an attribute area 280, an area 282 for recording the number of vertexes, and areas 284, 286, . . . for recording the coordinate values.

As the coordinate values recorded in areas 264, 266, 284, 288 and the like, not the position on the display unit but a relative position to the line to which writing is done, is used in the present embodiment. Specifically, a coordinate system is assumed, which has an upper left vertex of a rectangle surrounding the line to which the writing is done as the origin. Coordinate values of a vertex of a polygonal line in this coordinate system is recorded here. In the present embodiment, the origin of this coordinate system matches the position serving as a reference for determining the write position of the handwritten data described with reference to FIGS. 7 to 10 above.

For example, coordinates of each vertex of handwritten data 310 shown in FIG. 7 are values in the coordinate system whose origin is the upper left vertex of rectangle 320. As shown in the example of FIG. 8, when the handwritten data 330 is written above the rectangle 332 surrounding the written line, the coordinate value or values may be negative. The size of rectangles 320, 332 and the like surrounding the line to which writing is done is recorded in area 240 of FIG. 6, and used to determine whether the writing is on the margin area or not. Details will be described later.

The coordinate values of the vertexes of polygonal lines are recorded in terms of relative position as described above, from the following reasons. Generally, in a dynamic layout type electronic document, when display parameter or parameters are changed, lines on which characters are displayed are changed and often pages are changed. Therefore, if the position of writing is recorded not by the relative position with respect to the position of the line to which the writing is done, it becomes difficult to display the writing with the corresponding line when displayed in a different layout. This is the reason why the coordinate values are recorded as a relative position.

Image file name area 176 records, as described above, the name of an image file of the state of display on the display unit captured and saved when the handwritten data was written. As already described, if the display parameters at the time of writing differ from the display parameters at the time of display, a satisfactory display would not be given if the handwritten data were displayed simply overlapping the main body. Therefore, the image on the display unit at the time when the handwriting is done is captured and saved as an image file, and the file name of the image file is stored in image file name area 176. Then, even when the layout is changed and the relation between the handwritten data and the main body becomes unclear, the user can understand at least the positional relation between the handwritten data and the main body by opening the image file whose name is stored in image file name area 176. Capturing of the image can be done by simply saving the contents of a memory for image display.

For this purpose, the scope to be saved as the captured image should be sufficient to specify the positional relation between the handwritten data and the main body. Specifically, the scope corresponds to a circumscribed rectangle including the handwritten data, the line to which the handwriting is done and lines preceding and succeeding this line. The scope that is actually captured is not limited thereto. For instance, if the size of user data is to be made smaller, a circumscribed rectangle to the handwritten data may be captured. Where the data size does not cause any problem, the entire display on the display unit may be captured.

<Program Implementation>

Figure 12:
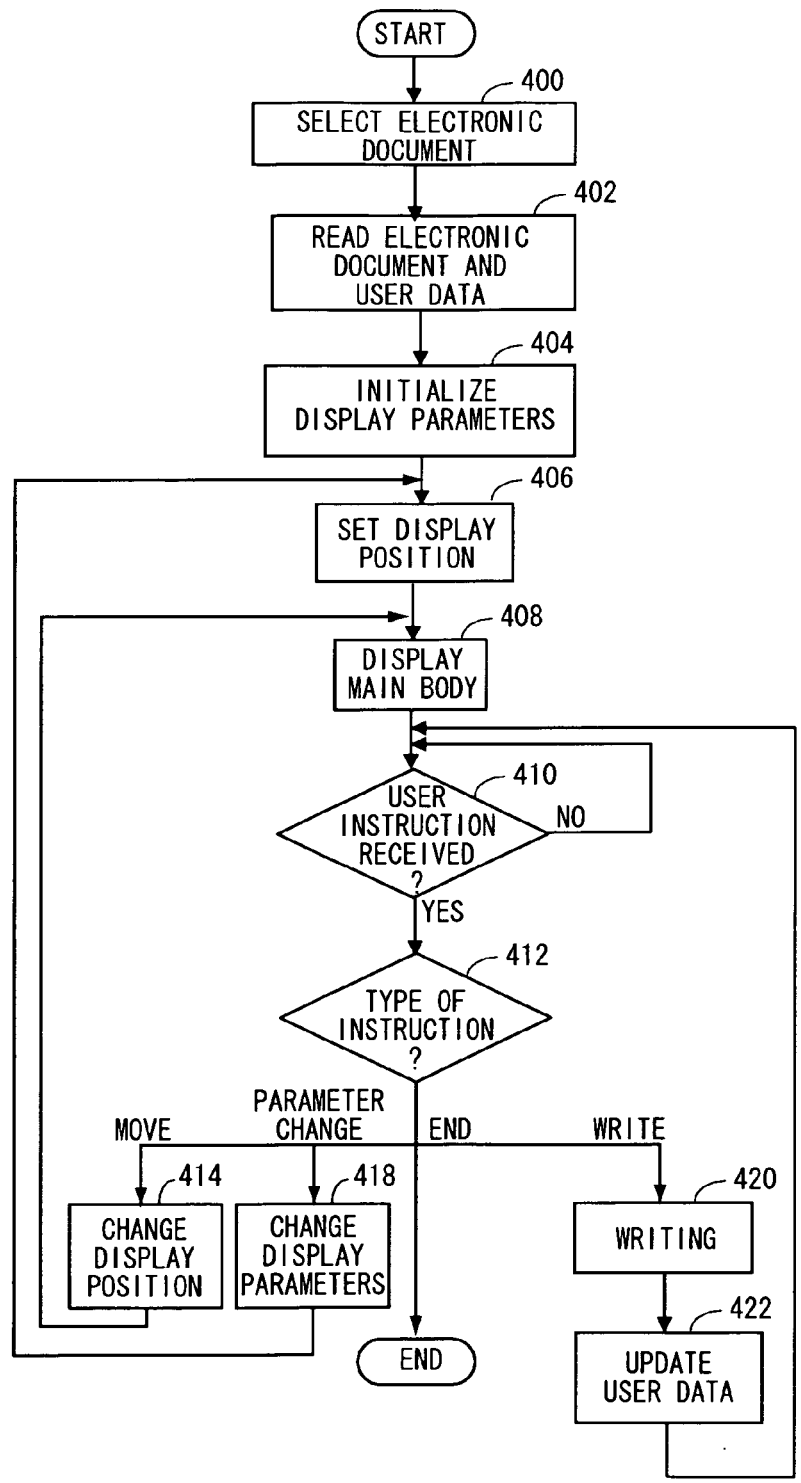
FIG. 12 is a flow chart representing a control structure of the program executed by display apparatus 50 in accordance with an embodiment of the present invention.

FIG. 12 shows, in a flow chart, the control flow of a computer program executed by the display apparatus for displaying the electronic document and the user data recorded in the form of FIGS. 5 and 6.

Referring to FIG. 12, first, in step 400, the user is urged to select an electronic document to be displayed, through user instruction processing unit 68. In step 402, document input unit 62 reads the designated electronic document from document storing unit 60. If there is any user data corresponding to the electronic document, the user data is simultaneously read from user data storing unit 64 by user data input/output unit 66.

In step 404, settings of various display parameters necessary for layout calculation are initialized. In the present embodiment, values used at the end of the last display of the document are used as the initial values.

In step 406, the position of display is set to the head of the read electronic document.

Next, in step S408, layout calculating unit 72 calculates the layout of one image plane of the electronic document and the user data of the portion corresponding to the display position, and applies the result to display unit 74. In accordance with the layout, display unit displays the designated one image plane. Details of the process in step 408 will be described later.

When the main body is displayed, in step 410, the flow waits for any instruction from the user. The process of step 410 is repeated until an instruction is given by the user ("NO" in step 410). When an instruction is given by the user in step 410 ("YES" in step 410), the control proceeds to step 412. In step 412, the process makes a branch dependent on the type of the instruction. Specifically, if the instruction is "move", the flow proceeds to step 414, if it is "change parameter", to step 418 and if it is "write", to step 420. If the instruction is "end", execution of the program is terminated.

The "move" instruction is to move the image plane forward or backward by one image plane from the currently displayed image plane. Here, in step 414, the position of the electronic document that is being displayed is changed to the designated position, and the flow returns to step 408. As a result, in step 408, layout of one image plane of the electronic document and the user data of the newly designated portion is calculated and the display is given on display unit 74.

In step 418, a display parameter or parameters stored in display parameter management unit 70 are updated. This process is for changing various parameters so that the electronic document can be browsed in a form easier for the user to read. In this process, the direction of imposition, that is, vertical writing or horizontal writing, name of the font to be used, font size, letter space, line space, word space and the like are changed as preferred by the user. The process of changing parameters is a conventional process.

After the parameters are changed in step 418, the control goes to step 406. In step 406, the display position is set to the head of the electronic document. Thereafter, in step 408, the layout of one image plane is calculated using the display parameters as updated, and a display is given in display unit (step 408). The process steps from step 410 and thereafter are the same as those described above, and therefore, details thereof will not be repeated here.

In step 420, the user is urged to input a plurality of polygonal lines forming the handwritten data through handwritten data input unit 76, and by layout calculating unit 72, a display image on which the handwritten data is overlapping the main body that is being displayed is formed on real time, and displayed on display unit 74. Thereafter, in step 422, the handwritten data input in step 420 is added to existing user data. Specifically, by user writing processing unit 78, referring to the handwritten data mentioned above, its position to the main body, and current display parameters held in the display parameter management unit, the data in the form of FIGS. 5 and 6 are prepared. Then, control proceeds to step 422.

In step 422, the handwritten data input by the user is stored in user data storing unit 64 through user data input/output unit 66. Then, the control returns to step 410.

Figure 13:
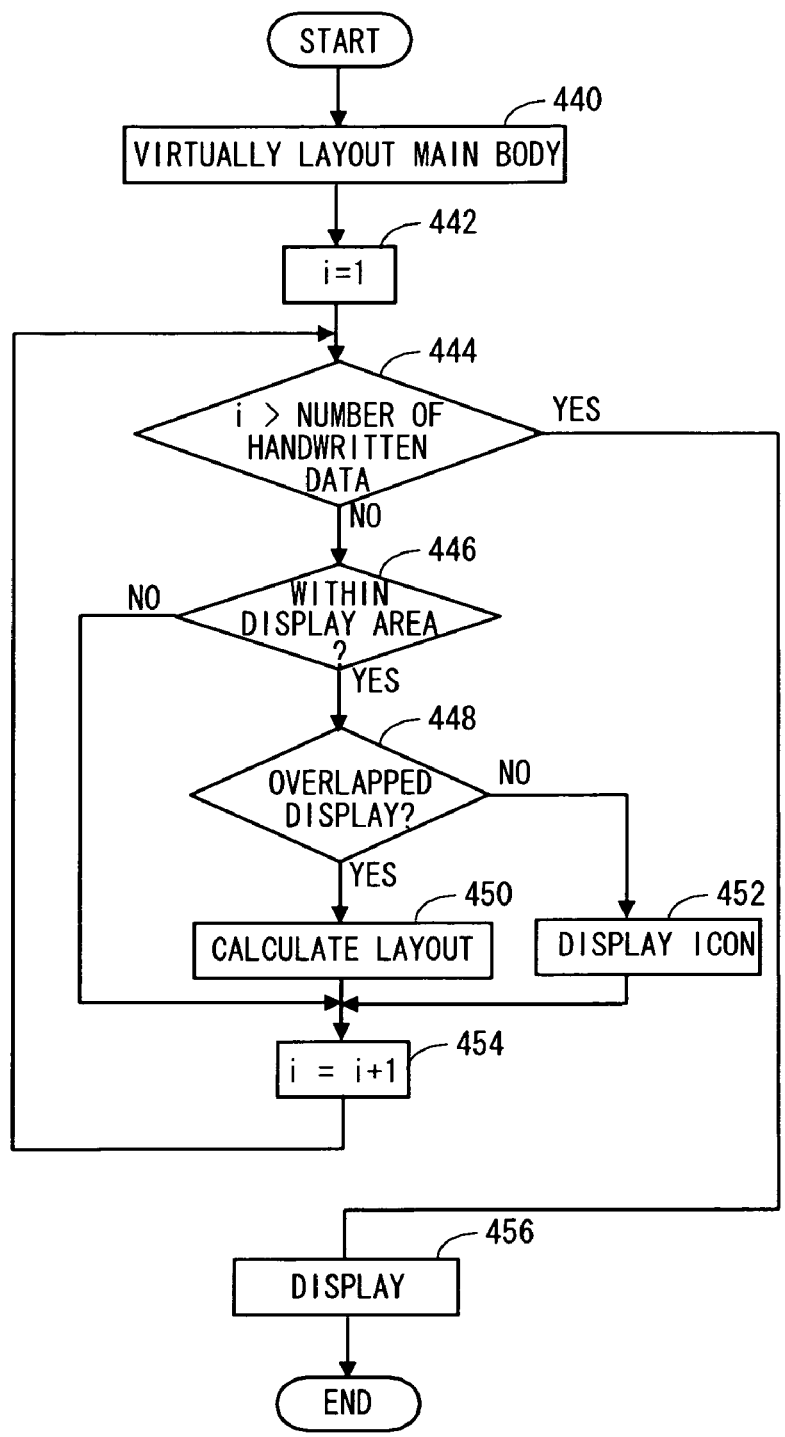
FIG. 13 is a flow chart representing details of a main body display process executed in step 408 of FIG. 12.

FIG. 13 shows, in a flow chart, details of step 408 of FIG. 12. This process is roughly divided into two, that is, a process of calculating the layout of the main body and the handwritten data on a prepared virtual image (steps 440 to 454), and a process of displaying on the display unit 74 in accordance with the layout calculated on the virtual image. The former process is done by layout calculating unit 72.

In step 440, main body data corresponding to one image plane starting from the display position set in step 406 is laid-out on the virtual image. At this time, the current display parameters stored in display parameter management unit 70 are used. By the process from step 442 to 454, the handwritten data is superposed on the virtual image plane prepared in step 440.

First, in step 442, 1 is input to a variable i that represents what number of handwritten data is being processed. If the variable i is "1", it means that the first handwritten data is being processed.

In step 444, the value of variable i is checked, and whether it is larger than the number stored in area 142 for storing the number of handwritten data or not is determined. In other words, whether all the handwritten data have been processed or not is determined. If it is "YES" in step 444, the flow proceeds to step 456, and otherwise, it proceeds to step 446.

Step 456 is done if the process described in the following is finished on all the handwritten data. Here, based on the layout of the virtual image, the main data and the handwritten data are displayed on display unit 74. When the display is complete, the process is terminated.

If it is "NO" in step 444, the following process takes place in step 446. Specifically, whether the position where the handwritten data is written is within the scope of the main body laid-out on the virtual image or not is determined. As the position of handwritten data, the values stored in area 190 shown in FIG. 6 are used. In step 446, if it is determined that all the scopes of handwritten data are out of the scope of the main body to be displayed, the control proceeds to step 454, and if not, to step 448.

In step 454, the value of variable i is incremented by 1, and the next handwritten data is processed, returning to step 444.

Figure 2:
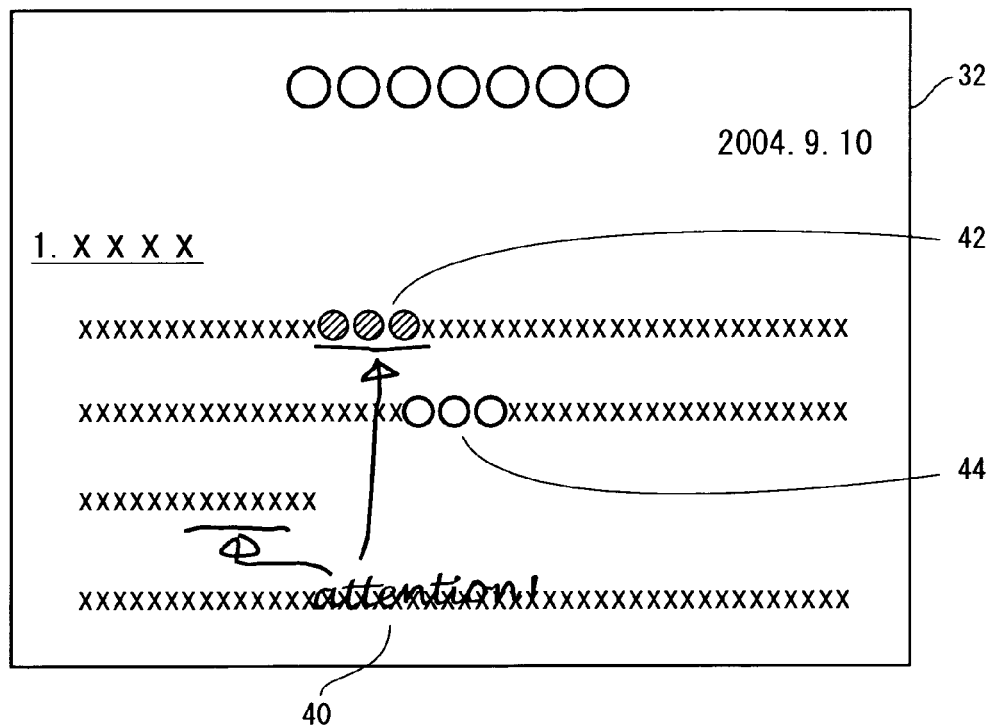
FIG. 2 shows a state in which position of display of the handwritten data is off from the electronic document.

If it is determined in step 446 that all or some of the handwritten data are within the scope of the main body to be displayed, the following process is executed in step 448. Specifically, whether a mismatch between the displays of the main body and the handwritten data such as shown in FIG. 2 occurs or not when the handwritten data is overlapping the main body is determined. Details of the process of step 448 will be described later. If it is determined in step 448 that there would be no problem in overlapping display, the control proceeds to step 450, and if not, to step 452.

Figure 15:
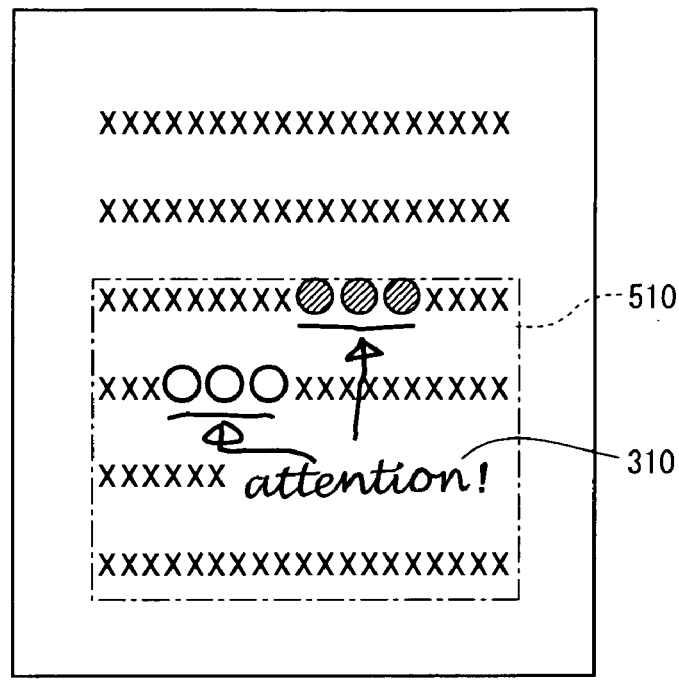
FIG. 15 shows the display unit displaying the handwritten data written in the main body area overlapping the main body.

In step 450, the handwritten data is laid-out on the virtual image. FIG. 15 is an example of the display when the handwritten data is recorded within the display area of the main body, as in the case of handwritten data 310 of FIG. 7. Handwritten data 310 is laid-out on the line 312 to which the writing was done (rectangle 320 of FIG. 7). At this time, the information of handwritten data 174 of FIG. 6 is used.

Figure 16:
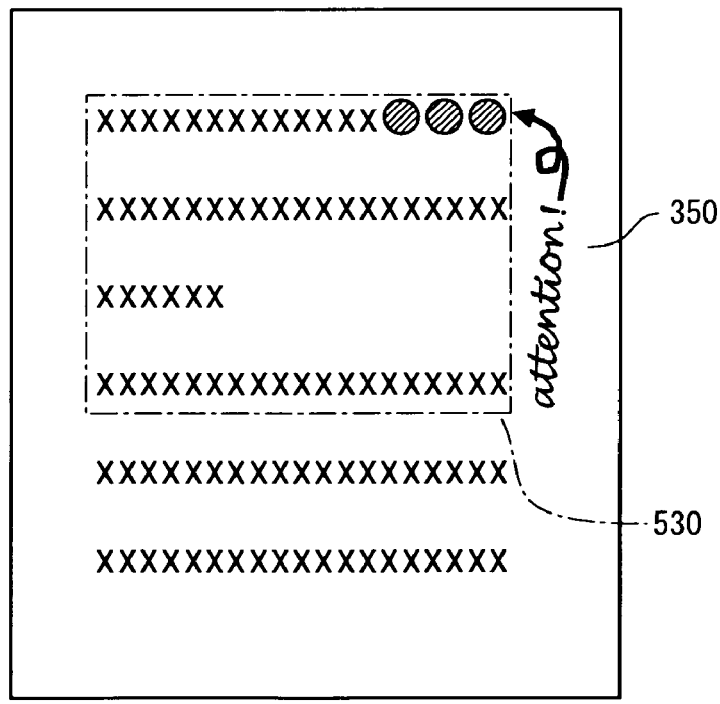
FIG. 16 shows the display unit displaying the handwritten data written on a right margin overlapping the main body.

FIG. 16 is an example of the display when the handwritten data is recorded only on the right margin, such as in the case of handwritten data 350 shown in FIG. 10. In this case also, handwritten data 350 is laid-out on the right margin of line 530 that corresponds to the line (rectangle 352 of FIG. 10) to which writing was done. At this time, the information of handwritten data 174 of FIG. 6 is used. As will be described later, the line width 382 of the main body display area when the handwritten data was written may be different from the width at the time of layout on the virtual image. Therefore, in order that the right edge at the time of writing matches the right edge of the line on the virtual image, the handwritten data is displayed while moved to the right and left appropriately.

When the handwritten data is written only in the left margin, the information of handwritten data 174 shown in FIG. 6 is used as it is, and the handwritten data is laid-out on the virtual image.

Figure 17:
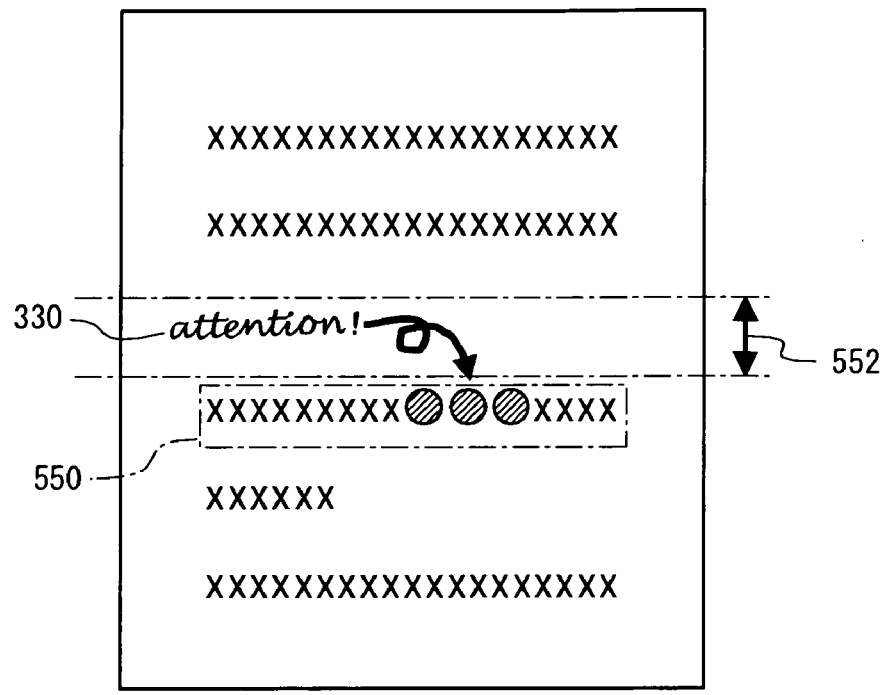
FIG. 17 shows the display unit displaying the handwritten data written on an upper margin overlapping the main body.

FIG. 17 is an example of display when the handwritten data is recorded on the upper margin as represented by handwritten data 330 of FIG. 8. When the handwritten data is written only on the upper margin or written across the character area and the upper margin, it is often the case that a line 550 that corresponds to the line to which writing was done (rectangle 332 of FIG. 8) does not come to the head of the display portion. In that case, line space immediately preceding the line 550 is made wider by an area 552 that goes over the upper margin, and the handwritten data 330 is displayed on this area. When the handwritten data is recorded on the upper margin, the coordinate values in the vertical direction of respective vertexes forming the polygonal lines have negative values. Therefore, the minimum value of negative coordinate value is found and the absolute value of this minimum value is used as the height of area 552. On the contrary, when the line 550 is positioned at the head of the display unit, the handwritten data can be displayed directly on the margin, without the necessity of widening the line space.

Figure 18:
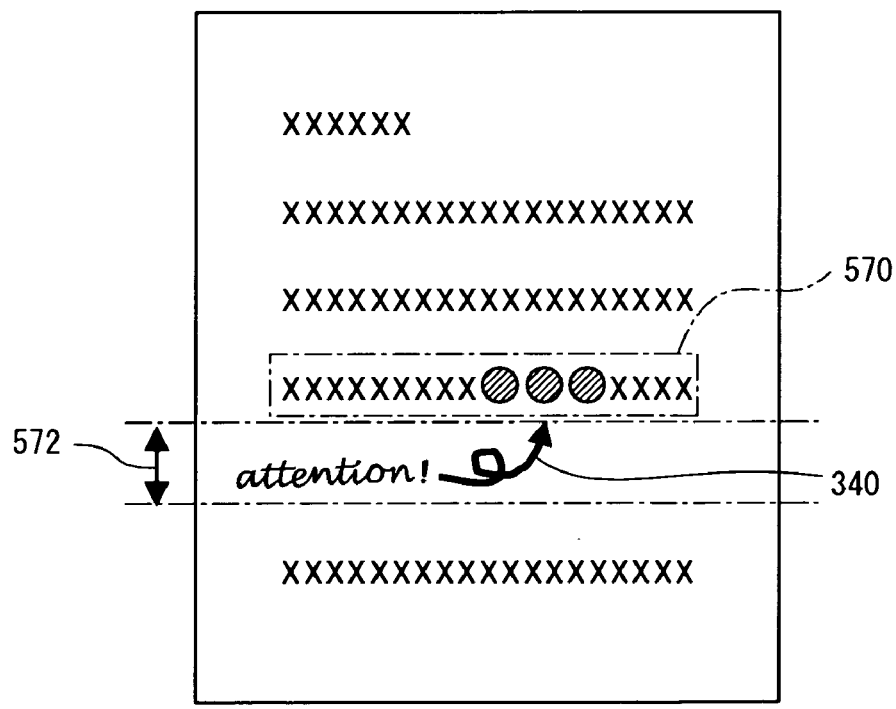
FIG. 18 shows the display unit displaying the handwritten data written on a lower margin overlapping the main body.

FIG. 18 shows an example of display when the handwritten data is recorded on the lower margin as represented by handwritten data 340 of FIG. 9. When the handwritten data is written only on the lower margin or written across the character area and the lower margin, it is often the case that a line 570 that corresponds to the line to which writing was done (rectangle 342 of FIG. 9) does not come to the bottom of the display portion. In that case, line space immediately succeeding the line 570 is made wider by an area 572 that goes over the lower margin, and the handwritten data 340 is displayed on this area. When the handwritten data is recorded on the lower margin, the coordinate values in the vertical direction of respective vertexes forming the polygonal lines are larger than the vertical size recorded in area 240 recording the size of the area where the handwritten data was written. Therefore, the maximum value of the coordinate values in the vertical direction of the polygonal lines forming the handwritten data is found, and the value obtained by adding the vertical size of handwritten data 340 to the coordinate values of line 570 is used as the position of the next line. When the line 570 comes to the bottom of the display unit, the handwritten data is displayed directly, without the necessity of widening the line space.

Figure 19:
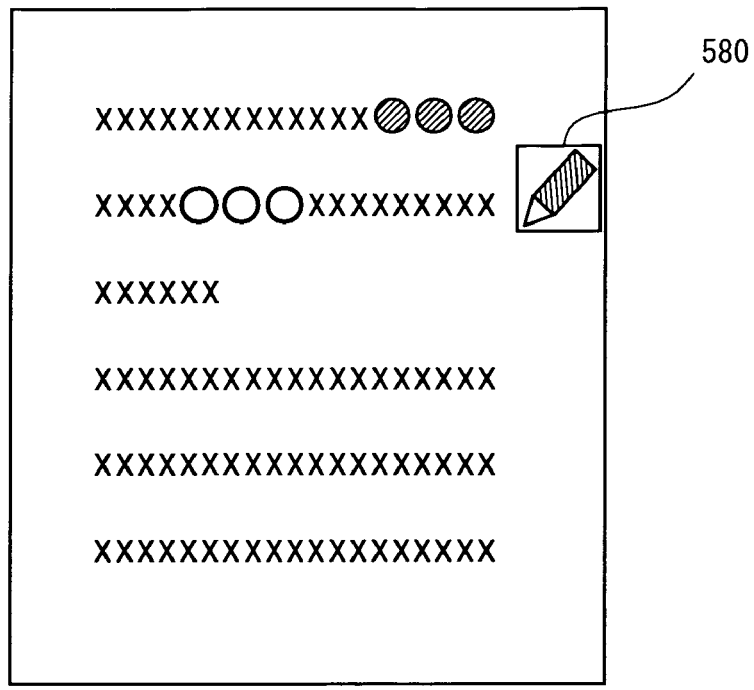
FIG. 19 shows an example of an icon displayed when it is impossible to display the handwritten data overlaping the main body.

Again referring to FIG. 13, if it is determined in step 448 that overlapping display is not possible ("NO" in 448), the control proceeds to step 452. In step 452, rather than recording the handwritten data in the overlapping manner, an icon 580, which indicates that a handwritten memo was recorded, is laid-out on the right margin of the line, as shown in FIG. 19. In the present embodiment, when the user clicks icon 580, the image file recorded in image file name area 176 shown in FIG. 16 is read, and the image captured when the handwritten data was input is displayed in front of display unit 74, as represented by a window 600 of FIG. 20. As a result, even when it is impossible to display the handwritten data overlapping the main body, the positional relation between the handwritten data and the main body at the time when the handwritten data was input can correctly be presented to the user.

Referring to FIG. 13, when the process of step 450 or 452 ends, the control proceeds to step 454. In step 454, the value of variable i is incremented by 1, as described above. Then, the control returns to step 444 to be ready for the processing of the next handwritten data.

Figure 14:
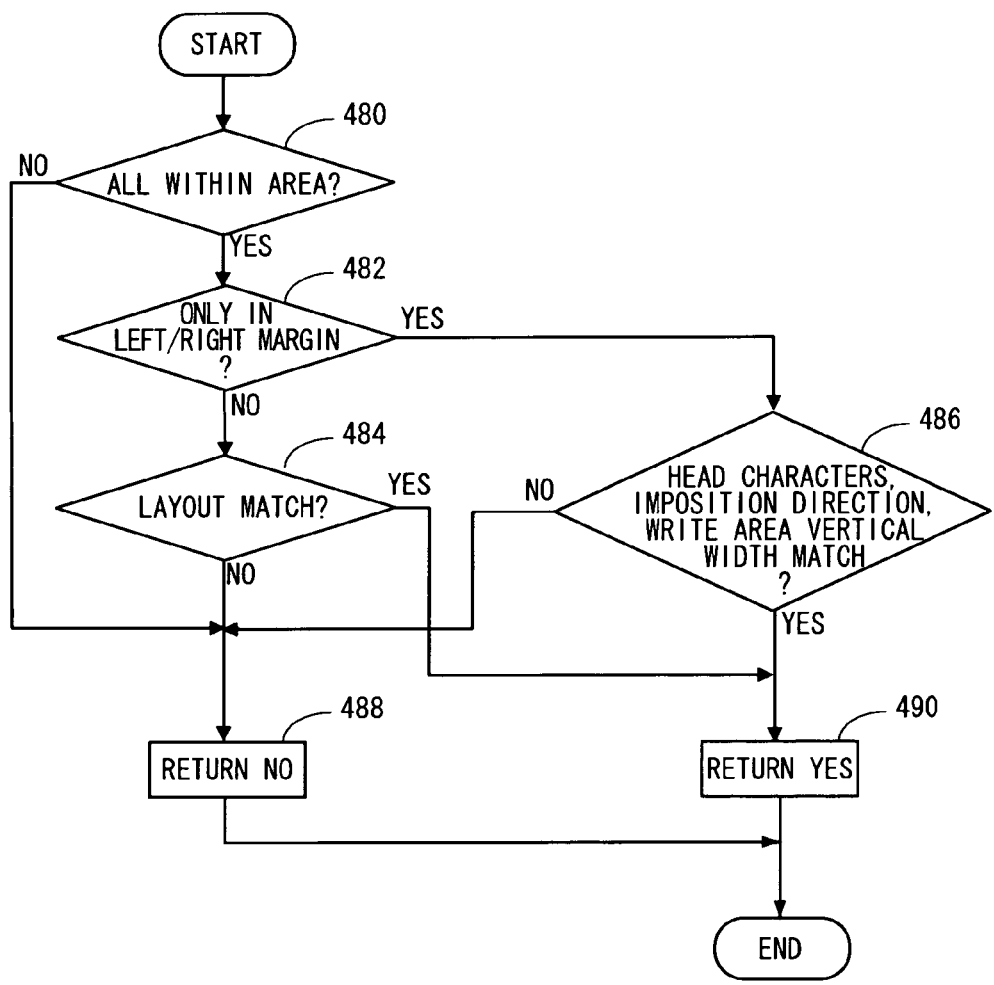
FIG. 14 is a flow chart representing details of a process for determining whether overlapping display is possible or not, executed in step 448 of FIG. 13.

Details of the process for determining whether overlapping display is possible or not, which is done in step 448 of FIG. 13, is shown in a flow chart of FIG. 14. Referring to FIG. 14, in step 480, whether the entire area to which the handwritten data was written is within the scope of the main body laid-out in the virtual image or not is determined. The determination is made based on the value stored in area 190. If it is "NO" in step 480, the control proceeds to step 488 and otherwise, to step 482.

In step 488, the process is terminated with the value "NO", which indicates that overlapping causes a problem, set as the return value.

In step 482, whether the entire area to which the handwritten data was written is only on the left margin (in the case of vertical writing, upper margin), or only on the right margin (in the case of vertical writing, lower margin) is determined. Determination as to which area the writing was done is made by comparing the value of area 240 shown in FIG. 6 with the coordinate values of each vertex (values in areas 264, 266, . . . , 284, 286, . . . recording the coordinate values).

By way of example, when the handwritten data is recorded on the right margin, the value in the horizontal direction of the coordinates of respective vertexes of the polygonal lines forming the handwritten data becomes larger than the lateral (horizontal) size recorded in area 240. When the handwritten data is recorded on the left margin, the value in the horizontal direction of the coordinates of respective vertexes of the polygonal lines forming the handwritten data comes to be negative. Utilizing this characteristic, determination of step 482 is made.

If it is "NO" in step 482, the control proceeds to step 484, and otherwise, the control proceeds to step 486.

In step 484, whether the layout of the main body at the time when the handwritten data was written matches the layout on the virtual image is determined. Specifically, whether the head character of each line to which the handwritten data was written (specified by the value stored in line head data storing area 180 of FIG. 6) is also at the head of the line in the layout of virtual image or not (no matter what number of line on the display unit) is determined and, further, whether all the display parameters (values of display parameter area 172 of FIG. 6) are the same as the current display parameters or not is determined. If both determinations are positive, these layouts are determined to be matching, and the control proceeds to 490. Otherwise, the control proceeds to step 488.

In step 490, the process is terminated with the value "YES", which indicates that overlapping causes no problem, set as the return value.

If it is "YES" in step 482, the following process is executed in step 486. Specifically, among the parameters stored in area 144 for storing handwritten data of FIG. 6, whether each head character of the lines to which writing was done (line head data storing area 180 of FIG. 6), direction of imposition (value in area 210 of FIG. 6 for recording direction of imposition) and the vertical size of the written line area (horizontal size for vertical writing) (value in area 240 of FIG. 6) match those of layout calculation on the virtual image or not is determined. When these are determined to be matching, the control proceeds to step 490, and otherwise, to step 488.

As described above, if it is possible to display the main body and the handwritten data overlapping, the value "YES" is returned in step 490, and otherwise, the value "NO" is returned in step 488.

Supplementary description will be given on the process of step 486 shown in FIG. 14. Different from step 484, in step 486, only a part of the parameters stored in area 144 are used to determine whether overlapping is possible or not. The reason is as follows. When the handwritten data is only on the left margin or right margin (upper or lower margin in the case of vertical writing), what is important is only the positional relation between lines to each other as well as the head characters of respective lines, to ensure that the position of the handwritten memo matches the position of the main body. On the other hand, the layout of each character on a line (horizontal layout for horizontal writing and vertical layout for vertical writing) does not have any influence on the deviation of positional relation between the handwritten data and the main body, as long as the head character and the last character of one line are the same as those of the original layout. Therefore, in step 486, parameters that have influence on the horizontal direction for horizontal writing and vertical direction for vertical writing are not subjected to comparison. As a result, even when the line width 382 at the time of writing is different from that in the virtual image layout, overlapping display is determined to be possible as long as the head character of each line, direction of imposition and the vertical size of written line match.

<Operation>

The display apparatus 50 having the above-described structure operates as follows. Referring to FIG. 3, when the user turns the power on by operating a power switch, not shown, the display apparatus 50 enters a state of waiting for any user instruction. At this time, control unit 80 initializes display parameters of the document to prescribed values (last values). When there is an instruction from the user, the input is applied through control unit 80 to user instruction processing unit 68, and what process should be done next is determined by user instruction processing unit 68.

When the user selects an electronic document display process, control unit 80 instructs document input unit 62 to form a list of electronic documents stored in document storing unit 60, and the list is displayed on display unit 74. When the user selects an electronic document from the list displayed on display unit 74, control unit 80 instructs document input unit 62 to read the document from document storing unit 60. Further, control unit 80 instructs user data input/output unit 66 to read the user data, if any, corresponding to the electronic document.

In response to the instruction from control unit 80, document storing unit 60 applies the read document to layout calculating unit 72. If there is any user data that corresponds to the designated document, user data input/output unit 66 applies the user data to layout calculating unit 72. The process when there is no corresponding user data, is not related to the present invention, and therefore, only the operation when the user data exists will be described in the following.

Layout calculating unit 72 calculates the layout, on the document applied from document input unit 62 and the user data applied from user data input/output unit 66, using the display parameters set by control unit 80 and various data stored in user data 130 (see FIG. 5). Layout calculating unit 72 causes the main body and the handwritten data of the first page to be displayed in accordance with the calculated layout, on display unit 74.

In this layout, as already described with reference to FIGS. 15 to 18, the display position of the handwritten data is determined and the display position of the main body is changed as needed, so that the handwritten data and the corresponding characters of the main body are overlapping correctly. If such overlapping is impossible, icon 580 is displayed in place of the handwritten data, as shown in FIG. 19.

After the display is given, the display apparatus 50 again enters a state of waiting for the user instruction.

When there is an instruction from the user to display the next page, control unit 80 instructs layout calculating unit 72 to calculate the layout of the next page. Layout calculating unit 72 calculates the layout of the second page in the similar manner as the first page, and displays the laid-out data on display unit 74. When there is an instruction to display the previous page, control unit 80 instructs layout calculating unit 72 to calculate the layout of the previous page. Layout calculating unit 72 calculates the layout of the designated page, and displays the laid-out data on display unit 74.

Thereafter, control unit 80, layout calculating unit 72 and display unit 74 repeat the similar processes every time the user instructs to move pages.

When the user selects a process for changing the setting of display, control unit 80 causes display unit 74 to display an image for setting display parameters, to receive the user input. The input from the user is applied to parameter management unit 70, and parameter management unit 70 applies the display parameter to user writing processing unit 78. User writing processing unit 78 has the layout calculating unit 72 calculate a new layout in accordance with the display parameter, and causes the display unit 74 to display the electronic document and the handwritten data in the new layout.

When there is a handwriting input instruction from the user, control unit 80 instructs handwritten data input unit 76 to be ready for the handwritten input by the user. The handwritten data input by the user is applied as input position and input polygonal line data, from handwritten data input unit 76 to user writing processing unit 78. User writing processing unit 78 applies the handwritten data to layout calculating unit 72. Layout calculating unit 72 adds, on real time basis, the handwritten data to the image in accordance with the applied input position and the polygonal line data of the handwritten data, and updates the display of display unit 74. Further, control unit 80 captures the state of display on the display unit 74 at this time, and stores it in user data storage unit 64 with a prescribed file name. Further, control unit 80 applies the file name to user writing processing unit 78.

User writing processing unit 78 holds the handwritten data input in this manner together with the file name of the captured image and the display parameters at that time.

Figure 20:
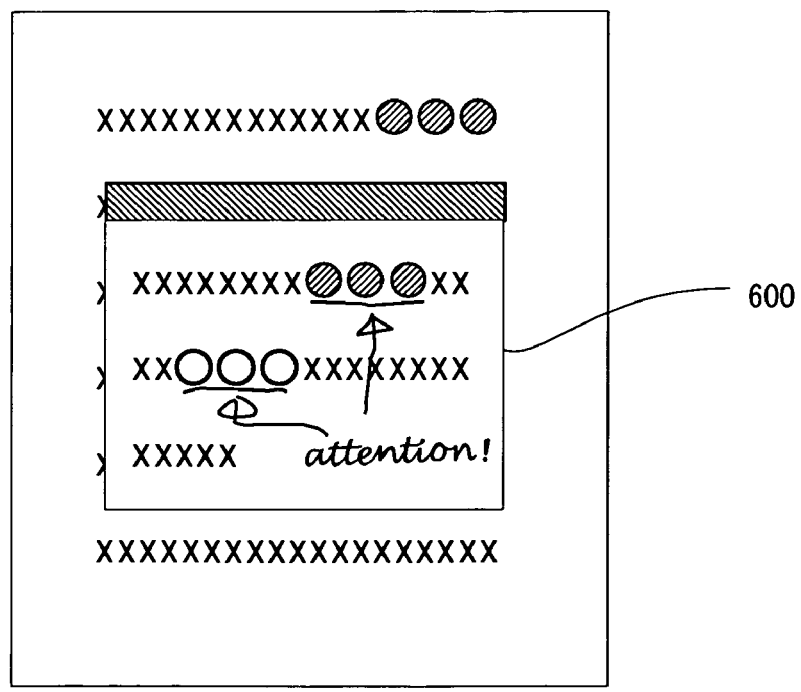
FIG. 20 shows an example of an image displayed when the icon of FIG. 19 is clicked.

When the user clicks the icon 580 shown in FIG. 19, the information is applied to control unit 80. In response to the click, control unit 80 reads the capture data of the image at the time of writing, from image file name area 176 of handwritten data (see FIG. 6) related to the handwritten data. Further, control unit 80 applies the image to display unit 74 so that it is displayed on a new window such as shown in FIG. 20. The window can be closed in response to a prescribed instruction (for example, by clicking a prescribed position at an upper portion of the window).

When the user inputs an instruction to end the display of the document, control unit 80 asks the user as to whether the change made to the document should be saved or not, and receives an instruction from the user. When an instruction not to save is received, control unit 80 deletes the file of the captured image, if any, stored in user data storing unit 64, and again displays the list of the documents stored in document storing unit 60. When an instruction to save is received, control unit 80 instructs user writing processing unit 78 to store the data written by the user.

In response, user writing processing unit 78 applies the newly input user data and the display parameters at that time to user data input/output unit 66. Based on the user data and the display parameters, user data input/output unit 66 forms handwritten data in accordance with the format of area 144 for storing the handwritten data shown in FIG. 6, adds the same as the new handwritten data to the last part of user data 130 shown in FIG. 5, and stores in user data storing unit 64.

When the display position of an existing handwritten data has been changed, for example, the new handwritten data is formed using the display parameters at that time and the file name of the image captured, based on the existing handwritten data. When the document is to be saved, the corresponding old handwritten data in user data 130 (FIG. 5) is replaced by the new handwritten data, and the user data 130 is stored in user data storing unit 64.

When the document is read next time, as for the handwritten data that was not changed, the data is stored as it is in user data 130, and therefore, display is given through the same operation as described above. As to the handwritten data that was added or changed, the handwritten data as added or changed is stored in user data 130. Therefore, the data are displayed in accordance with the added or changed handwritten data. It is noted, however, that the operation of display apparatus 50 itself is the same as for the handwritten data that has not been changed.

In this manner, by the display apparatus 50 in accordance with the present embodiment, when setting of display of an electronic document is changed, the handwritten data is displayed in a form corresponding to the characters of the corresponding electronic document in accordance with the changed setting. The display layout will not be deviated or shifted, and therefore, it is possible for the user to correctly interpret the handwritten data. Even when such a display is impossible, icon 580 shown in FIG. 19 is displayed, and by clicking the icon 580, the capture image showing the image at the time when handwriting was done can be displayed. Therefore, even when it is difficult to modify the layout, it is possible for the user to correctly understand the correspondence between the handwritten data and the main body.

Figure 21:
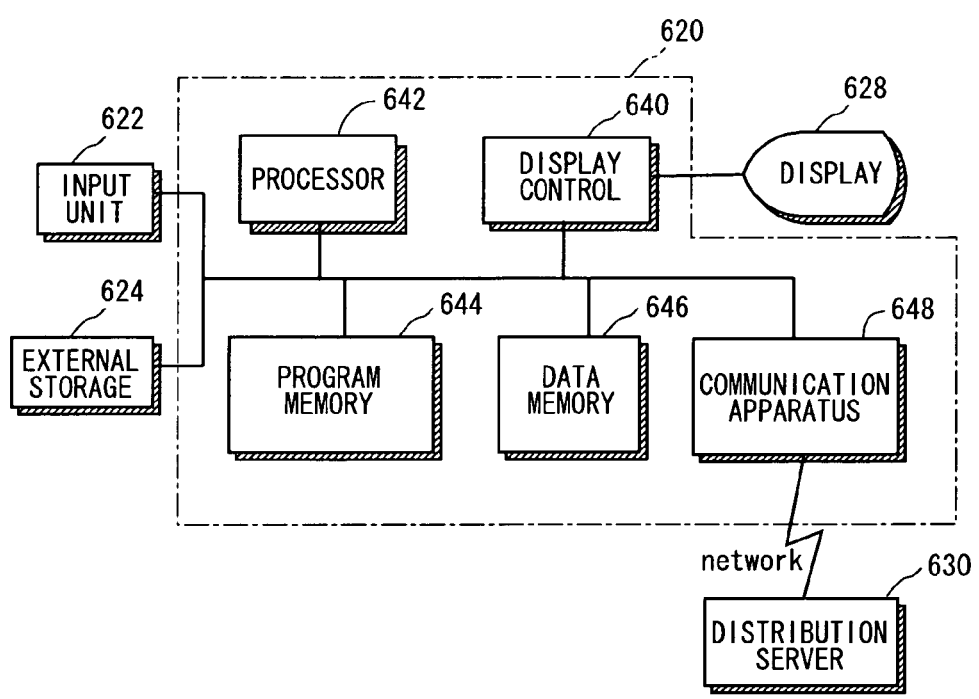
FIG. 21 is a hardware block diagram of display apparatus 50 in accordance with an embodiment of the present invention.

FIG. 21 is a block diagram of display apparatus 50 when the display apparatus 50 in accordance with the present embodiment is implemented with a computer program. As shown in FIG. 21, the body of display apparatus 50 is substantially a computer 620. By attaching a display unit 628 such as liquid crystal display, an input unit 622 for operating the display apparatus 620 and an external storage 624 such as an FD (Flexible Disk), a hard disk or the like, display apparatus 50 can be realized.

Computer 620 includes: a processor 624 connected to input unit 622 and to external storage 624; a display control unit 640 connected to processor 642 through a bus for displaying various pieces of information on display unit 628 under control of processor 642; a program memory 644 formed of a non-volatile memory connected to processor 642 through a bus, storing a computer program implementing various functions of display apparatus 50 described above to be executed by processor 642 and storing a prescribed operating system (OS) program and the like; a data memory 646 connected to processor 642 through a bus for storing data used when processor 642 executes the computer program; and a communication apparatus 648 for establishing communication between a distribution server 630 and processor 642 through a network.

The user selects the electronic document to be displayed, writes data by hand (inputs handwritten data), changes display parameter or parameters of the electronic document, or turns pages while the document is being displayed, using display unit 628 and input unit 622. External storage 624 stores the electronic document as the object of display, the user data including the handwritten data written by the user, as well as the computer program whose control structure is shown in FIGS. 12 to 14. The program may be installed beforehand in external storage 624, or it may be obtained through file transfer from distribution sever 630 to external storage 624 through communication apparatus 648 and the network, after shipping of display apparatus 50. When the power of display apparatus 50 is turned on and display of the electronic document is instructed, the program, electronic document, user data and the like are read from external storage 624 and loaded to program memory 644 and data memory 646, and processed by processor 642. In accordance with the result of execution of the program by processor 642, display control unit 640 displays, under control by processor 642, the information of electronic document and the handwritten data on display unit 628.

<Modification>

In the foregoing, the present invention has been described with reference to display apparatus 50 as an embodiment. The present invention is also applicable in various other forms. Some of the possible modifications will be described in the following.

First, in step 404 shown in FIG. 12, as the initial values of layout calculation, values used at the end of last display of the document are used. The present invention, however, is not limited to such embodiment. By way of example, unique display parameters of the display apparatus may be used as initial values. Alternatively, the initial values themselves may be set in advance by the user.

In step 406 of FIG. 12, the display position is set as the head of the read electronic document. The present invention, however, is not limited to such an embodiment. By way of example, when an electronic document is displayed, the position displayed at the end of the last viewing may be stored, and the display position may be set thereto.

The process of step 484 shown in FIG. 14 may be different from that described above. What is necessary is simply a determination as to whether the layout when the handwritten data was written is the same as the layout on the virtual image. Therefore, as long as that determination is possible, any information may be used, rather than recording the contents of writing area 170 and display parameter area 172. By way of example, the position of every character of a line to which handwriting was done may be recorded in relative coordinate values using an upper right coordinate values of the head line as a reference, and to determine whether the layout of each character match.

Further, in the embodiment described above, when icon 580 shown in FIG. 19 is clicked, the captured image is displayed on a separate window 600, as shown in FIG. 20. The present invention, however, is not limited to such an embodiment. For instance, the image display itself may be switched. Alternatively, the captured image may be displayed at a position not overlapping the display area of the main body.

It is also possible that the positions of all characters of the line to which handwriting was done at the time of writing are different from the positions on the layout of virtual image, in a prescribed magnitude. Specifically, there is a case where the relation $$x2 = x1 \times r$$

$$y2 = y1 \times r$$

holds, where the character at the time of writing has the coordinate values (x1, y1) and the corresponding coordinate values in the layout of the virtual image are (x2, y2), with r being a magnification rate. When this condition holds in the step 448 of FIG. 13, a determination of "YES" may be made, and in step 450, the handwritten data is enlarged/reduced with the magnification rate r, to be overlapping the main body.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. An apparatus for displaying an electronic document, comprising:
    a display unit having a prescribed display area;
    a first reading unit configured to read a dynamic layout type electronic document from a prescribed storage medium;
    a second reading unit configured to read, from a prescribed storage medium, user data including shape data specifying the shape of handwritten data written to said electronic document, write area information specifying a position in said electronic document where said handwritten data was written, and layout information at the time of writing specifying a display layout of said electronic document when said handwritten data was formed, and related to the electronic document read by said first reading unit; and
    a layout calculating unit configured to calculate a layout of said electronic document read by said first reading unit and layout of the handwritten data read by said second reading unit, based on a display parameter set in said display unit; wherein
    said layout calculating unit includes
    a determining unit configured to determine, using said display parameter and said layout information at the time of writing, whether it is possible to give a display maintaining positional relation between the handwritten data and the electronic document in the vicinity of said handwritten data at the time when said hand written data was formed, if said electronic document were laid-out using said display parameter and said handwritten data were laid-out based on the layout information at the time of writing;
    a first layout unit configured to calculate, in response to a determination by said determining unit that said display maintaining the relation is possible, a layout to have said handwritten data overlapping said electronic document while maintaining the positional relation between said handwritten data and said electronic document in the vicinity of said handwritten data, using said display parameter and said layout information at the time of writing; and
    a second layout unit for calculating a prescribed layout to have said handwritten data and said electronic document not overlapping each other, in response to a determination by said determining unit that said display maintaining the relation is impossible.

2. The apparatus for displaying an electronic document according to claim 1, wherein
    said user data includes a file name of an image file recording a state of display of said handwritten data and a main body, displayed on said display unit when said handwritten data was written; and
    said second layout unit executes a prescribed process for displaying said image file, in response to a determination by said determining unit that said display maintaining the relation is impossible.

3. The apparatus for displaying an electronic document according to claim 1, wherein
    said determining unit includes a unit for determining, when said write area information indicates that said handwritten data at the time of writing is entirely included in a margin on a side of a head or tail of a line of said electronic document, whether it is possible to give a display maintaining positional relation between the handwritten data and the electronic document in the vicinity of said handwritten data at the time when said hand written data was formed, using only a display parameter set in said display unit and information related to layout in a direction crossing the line among said layout information at the time of writing.

4. An apparatus for displaying an electronic document, comprising:
    a display unit having a prescribed display area;
    a first reading unit configured to read a dynamic layout type electronic document from a prescribed storage medium;
    a second reading unit configured to read, from a prescribed storage medium, user data including shape data specifying the shape of handwritten data written to said electronic document, write area information specifying a position in said electronic document where said handwritten data was written, and layout information at the time of writing specifying a display layout of said electronic document when said handwritten data was formed, and related to the electronic document read by said first reading unit; and
    a layout calculating unit configured to calculate a layout of said electronic document read by said first reading unit and layout of the handwritten data read by said second reading unit, based on a display parameter set in said display unit; wherein
    said layout calculating unit includes
    a determining unit configured to determine, using said display parameter and said layout information at the time of writing, whether it is possible to give a display maintaining positional relation between the handwritten data and the electronic document in the vicinity of said handwritten data at the time when said hand written data was formed, if said electronic document were laid-out using said display parameter and said handwritten data were laid-out based on the layout information at the time of writing; and
    a first layout unit configured to calculate, in response to a determination by said determining unit that said display maintaining the relation is possible, a layout to have said handwritten data overlapping said electronic document while maintaining the positional relation between said handwritten data and said electronic document in the vicinity of said handwritten data, using said display parameter and said layout information at the time of writing, wherein
    when said write area information indicates that said handwritten data at the time of writing is entirely included in a margin on a side of a head line of said prescribed display area and when the main body is laid-out by said layout calculating unit, a line that was displayed at the head in said prescribed display area at the time of writing of said handwritten data comes to be displayed on a second or following line, said first layout unit enlarges a line space immediately preceding said line, and lays-out said handwritten data in the enlarged line space.

5. An apparatus for displaying an electronic document, comprising:
    a display unit having a prescribed display area;

a first reading unit configured to read a dynamic layout type electronic document from a prescribed storage medium;

a second reading unit configured to read, from a prescribed storage medium, user data including shape data specifying the shape of handwritten data written to said electronic document, write area information specifying a position in said electronic document where said handwritten data was written, and layout information at the time of writing specifying a display layout of said electronic document when said handwritten data was formed, and related to the electronic document read by said first reading unit; and a layout calculating unit configured to calculate a layout of said electronic document read by said first reading unit and layout of the handwritten data read by said second reading unit, based on a display parameter set in said display unit; wherein said layout calculating unit includes a determining unit configured to determine, using said display parameter and said layout information at the time of writing, whether it is possible to give a display maintaining positional relation between the handwritten data and the electronic document in the vicinity of said handwritten data at the time when said hand written data was formed, if said electronic document were laid-out using said display parameter and said handwritten data were laid-out based on the layout information at the time of writing; and a first layout unit configured to calculate, in response to a determination by said determining unit that said display maintaining the relation is possible, a layout to have said handwritten data overlapping said electronic document while maintaining the positional relation between said handwritten data and said electronic document in the vicinity of said handwritten data, using said display parameter and said layout information at the time of writing, wherein when said write area information indicates that said handwritten data at the time of writing is entirely included in a margin on a side of a last line of said prescribed display area and when the main body is laid-out by said layout calculating unit, a line that was displayed as the last line in said prescribed display area at the time of writing of said handwritten data comes to be displayed on a line other than the last line, said first layout unit enlarges a line space immediately succeeding said line, and lays-out said handwritten data in the enlarged line space.

6. A computer implemented method of displaying an electronic document on a display apparatus having a prescribed display area serving also as a handwriting input apparatus, comprising:

a first reading step of reading a dynamic layout type electronic document from a prescribed storage medium;

a second reading step of reading, from a prescribed storage medium, user data including shape data specifying the shape of handwritten data written to said electronic document, write area information specifying a position in said electronic document where said handwritten data was written, and layout information at the time of writing specifying a display layout of said electronic document when said handwritten data was formed, and related to the electronic document read in said first reading step; and a step of calculating a layout of said electronic document read in said first reading step and a layout of the handwritten data read in said second reading step, based on a display parameter set in said display apparatus; wherein said step of calculating layouts includes the steps of determining, using said display parameter and said layout information at the time of writing, whether it is possible to give a display maintaining positional relation between the handwritten data and the electronic document in the vicinity of said handwritten data at the time when said hand written data was formed, if said electronic document were laid-out using said display parameter and said handwritten data were laid-out based on the layout information at the time of writing;

calculating, in response to a determination in said determining step that said display maintaining the relation is possible, a layout to have said handwritten data overlapping said electronic document while maintaining the positional relation between said handwritten data and said electronic document in the vicinity of said handwritten data, using said display parameter and said layout information at the time of writing; and calculating a prescribed layout to have said handwritten data and said electronic document not overlapping each other, in response to a determination by said determining unit that said display maintaining the relation is impossible.

7. A computer readable recording medium storing an instruction to cause a computer, which is connectable to a display apparatus having a prescribed display area also serving as a handwriting input apparatus and to a prescribed storage medium, to execute a method of displaying an electronic document, wherein said method includes:

a first reading step of reading a dynamic layout type electronic document from a prescribed storage medium;

a second reading step of reading, from a prescribed storage medium, user data including shape data specifying the shape of handwritten data written to said electronic document, write area information specifying a position in said electronic document where said handwritten data was written, and layout information at the time of writing specifying a display layout of said electronic document when said handwritten data was formed, and related to the electronic document read in said first reading step; and a step of calculating a layout of said electronic document read in said first reading step and a layout of the handwritten data read in said second reading step, based on a display parameter set in said display apparatus; wherein said step of calculating layouts includes the steps of determining, using said display parameter and said layout information at the time of writing, whether it is possible to give a display maintaining positional relation between the handwritten data and the electronic document in the vicinity of said handwritten data at the time when said hand written data was formed, if said electronic document were laid-out using said display parameter and said handwritten data were laid-out based on the layout information at the time of writing;

calculating, in response to a determination in said determining step that said display maintaining the relation is possible, a layout to have said handwritten data overlapping said electronic document while maintaining the positional relation between said handwritten data and said electronic document in the vicinity of said handwritten data, using said display parameter and said layout information at the time of writing; and calculating a prescribed layout to have said handwritten data and said electronic document not overlapping each other, in response to a determination by said determining unit that said display maintaining the relation is impossible.

8. An apparatus for displaying an electronic document, including a processor, a memory connected to the processor, a display unit, operatively connected to the processor, having a prescribed display area serving also as a handwriting input apparatus, and a prescribed storage medium coupled to said processor, for displaying an electronic document stored in said prescribed storage medium on said display area, wherein
   said memory stores a computer program executed by said processor; and
   said computer program includes:
   a first reading program code for reading a dynamic layout type electronic document from a prescribed storage medium;
   a second reading program code for reading, from a prescribed storage medium, user data including shape data specifying the shape of handwritten data written to said electronic document, write area information specifying a position in said electronic document where said handwritten data was written, and layout information at the time of writing specifying a display layout of said electronic document when said handwritten data was formed, and related to the electronic document read by said first reading program code; and
   a program code for calculating a layout of said electronic document read by said first reading program code and a layout of the handwritten data read by said second reading program code, based on a display parameter set in said display apparatus; wherein
   said program code for calculating layouts includes
   a program code for determining, using said display parameter and said layout information at the time of writing, whether it is possible to give a display maintaining positional relation between the handwritten data and the electronic document in the vicinity of said handwritten data at the time when said hand written data was formed, if said electronic document were laid-out using said display parameter and said handwritten data were laid-out based on the layout information at the time of writing, and
   a program code for calculating, in response to a determination by said determining program code that said display maintaining the relation is possible, a layout to have said handwritten data overlapping said electronic document while maintaining the positional relation between said handwritten data and said electronic document in the vicinity of said handwritten data, using said display parameter and said layout information at the time of writing; and
   a program code for calculating a prescribed layout to have said handwritten data and said electronic document not overlapping each other, in response to a determination by said determining unit that said display maintaining the relation is impossible.

* * * * *